US012694749B2

(12) United States Patent
Paterson et al.

(10) Patent No.: US 12,694,749 B2
(45) Date of Patent: Jul. 28, 2026

(54) SYSTEMS AND METHODS FOR ACCUMULATION AND APPLICATION OF ELECTRONIC GAMING ENHANCEMENTS

(71) Applicant: Aristocrat Technologies Australia Pty Limited, North Ryde (AU)

(72) Inventors: Lauren Paterson, Kellyville (AU); Antoon Visser, Coogee (AU); Colin Fong, Penshurst (AU); Glenn Wiryadi, St Ives (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 232 days.

(21) Appl. No.: 18/506,794

(22) Filed: Nov. 10, 2023

(65) Prior Publication Data

US 2024/0378944 A1 Nov. 14, 2024

(30) Foreign Application Priority Data

May 11, 2023 (AU) ................................ 2023202956

(51) Int. Cl.
*G07F 17/32* (2006.01)
*G07F 17/34* (2006.01)

(52) U.S. Cl.
CPC ...... *G07F 17/3213* (2013.01); *G07F 17/3267* (2013.01); *G07F 17/34* (2013.01)

(58) Field of Classification Search
CPC ............. G07F 17/3267; G07F 17/3213; G07F 17/326; G07F 17/3258
See application file for complete search history.

(56) References Cited

U.S. PATENT DOCUMENTS

| | | | | | |
|---|---|---|---|---|---|
| 6,186,894 | B1 * | 2/2001 | Mayeroff | G07F 17/34 | 463/16 |
| 7,824,263 | B2 * | 11/2010 | Baerlocher | G07F 17/34 | 463/20 |
| 8,992,300 | B2 * | 3/2015 | Williams | G07F 17/32 | 463/16 |
| 2009/0075722 | A1 * | 3/2009 | Louie | G07F 17/32 | 463/20 |
| 2012/0172107 | A1 * | 7/2012 | Acres | G07F 17/34 | 463/16 |
| 2015/0080088 | A1 * | 3/2015 | Smalley | G07F 17/3244 | 463/20 |
| 2021/0065503 | A1 * | 3/2021 | Englman | G07F 17/34 | |
| 2021/0248864 | A1 * | 8/2021 | Marks | G07F 17/3258 | |
| 2023/0031773 | A1 * | 2/2023 | Penacho | G06F 7/588 | |
| 2023/0035244 | A1 * | 2/2023 | Penacho | G07F 17/3211 | |

* cited by examiner

*Primary Examiner* — Justin L Myhr
(74) *Attorney, Agent, or Firm* — Armstrong Teasdale LLP

(57) ABSTRACT

An electronic gaming system including a memory and a processor is described. The processor is configured to cause a number of multiplier symbols to be accumulated during a first electronic game and for each of the number of multiplier symbols, provide a play of a second electronic game wherein the processor is further configured to cause display of a multiplier symbol in a first display area, cause display of a subset of the number of multiplier symbols in a second display area, cause display of an outcome associated with an output amount on a plurality of reels in a third display area, apply a multiplier value associated with the multiplier symbol to the output amount, and cause display of a next multiplier symbol of the subset of the number of multiplier symbols in the second display area.

20 Claims, 31 Drawing Sheets

300

| | 341 | 342 | 343 | 344 | 345 |
|---|---|---|---|---|---|
| 301 | **Reel Strip 1** | **Reel Strip 2** | **Reel Strip 3** | **Reel Strip 4** | **Reel Strip 5** |
| 302 | A | 10 | Q | 10 | PIC1 |
| 303 | PIC3 | J | K | PIC2 | SCAT |
| 304 | PIC3 | Q | 9 | PIC3 | PIC3 |
| 305 | PIC2 | PIC4 | PIC2 | 9 | Q |
| 306 | K | A | PIC1 | Q | A |
| 307 | SCAT | SCAT | 10 | A | Q |
| 308 | PIC3 | PIC1 | K | A | Q |
| 309 | A | J | WILD | 10 | WILD |
| 310 | J | Q | J | PIC2 | K |
| 311 | 10 | K | PIC3 | K | 9 |
| 312 | A | 9 | Q | PIC1 | PIC4 |
| 313 | PIC3 | K | PIC3 | SCAT | 10 |
| 314 | 10 | 10 | SCAT | SCAT | 10 |
| 315 | SCAT | SCAT | Q | J | Q |
| 316 | SCAT | WILD | Q | 10 | A |
| 317 | PIC1 | J | 10 | A | 10 |
| 318 | J | J | A | PIC4 | K |
| 319 | Q | A | SCAT | 9 | A |
| 320 | PIC4 | PIC2 | PIC2 | 9 | J |
| 321 | A | PIC3 | Q | PIC2 | PIC3 |
| 322 | PIC1 | 9 | A | PIC1 | PIC4 |
| 323 | A | PIC3 | J | WILD | 10 |
| 324 | J | K | J | PIC3 | J |
| 325 | Q | Q | PIC4 | Q | Q |
| 330 | PIC2 | Q | 9 | A | PIC3 |
| | ... | ... | ... | ... | ... |

FIG. 3

SYSTEMS AND METHODS FOR ACCUMULATION AND APPLICATION OF ELECTRONIC GAMING ENHANCEMENTS

CROSS REFERENCE TO RELATED APPLICATIONS

This application claims the benefit of priority to Australia Patent Application No. 2023202956, filed May 11, 2023, which is hereby incorporated herein by reference in its entirety.

FIELD

The present application relates to a gaming device, a method of operating a gaming device and a system with hold and spin game instances that award a set of multipliers for further game instances.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

In one aspect, an electronic gaming device including at least one memory with instructions stored thereon and at least one processor in communication with the at least one memory is described. The instructions, when executed by the at least one processor, cause the at least one processor to cause a number of multiplier symbols to be accumulated during a first electronic game wherein each multiplier symbol of the number of multiplier symbols is associated with a multiplier value and for each of the number of multiplier symbols accumulated during the first electronic game, provide a play of a second electronic game wherein, for at least one play of the second electronic game, the instructions further cause the at least one processor to cause display of a multiplier symbol of the number of multiplier symbols in a first display area wherein the multiplier value associated with the multiplier symbol will be applied during the at least one play of the second electronic game, cause display of a subset of the number of multiplier symbols in a second display area, the subset of the number of multiplier symbols including remaining multiplier symbols of the number of multiplier symbols associated with remaining multiplier values to be applied in at least one future play of the second electronic game, cause display of at least one outcome for the at least one play on a plurality of reels in a third display area wherein the at least one outcome is associated with at least one output amount, apply the multiplier value associated with the multiplier symbol to the at least one output amount to generate at least one multiplied output amount, provide the at least one multiplied output amount, and cause display of a next multiplier symbol of the subset of the number of multiplier symbols in the second display area to indicate that the multiplier value associated with the next multiplier symbol will be applied in a next at least one play of the second electronic game.

In another aspect, at least one non-transitory computer-readable storage medium with instructions stored thereon is described. The instructions, in response to execution by at least one processor, cause the at least one processor to cause a number of multiplier symbols to be accumulated during a first electronic game wherein each multiplier symbol of the number of multiplier symbols is associated with a multiplier value and for each of the number of multiplier symbols accumulated during the first electronic game, cause a play of a second electronic game to be provided wherein, for at least one play of the second electronic game, the instructions further cause the at least one processor to cause a multiplier symbol of the number of multiplier symbols to be displayed in a first display area wherein the multiplier value associated with the multiplier symbol will be applied during the at least one play of the second electronic game cause a portion of the number of multiplier symbols to be displayed in a second display area, the portion of the number of multiplier symbols including remaining multiplier symbols of the number of multiplier symbols associated with remaining multiplier values to be applied in at least one future play of the second electronic game, cause at least one outcome for the at least one play to be displayed on a plurality of reels in a third display area wherein the at least one outcome is associated with at least one output amount, cause the multiplier value associated with the multiplier symbol to be applied to the at least one output amount to generate at least one multiplied output amount, cause the at least one multiplied output amount to be provided, and cause a next multiplier symbol of the portion of the number of multiplier symbols to be displayed in the second display area to indicate that the multiplier value associated with the next multiplier symbol will be applied in a next at least one play of the second electronic game.

In another aspect, a method of electronic gaming implemented by at least one processor in communication with at least one memory is described. The method includes controlling a number of multiplier symbols to be accumulated during a first electronic game wherein each multiplier symbol of the number of multiplier symbols is associated with a multiplier value and for each of the number of multiplier symbols accumulated during the first electronic game, providing a play of a second electronic game wherein, for at least one play of the second electronic game, the method further includes controlling display of a multiplier symbol of the number of multiplier symbols in a first display area wherein the multiplier value associated with the multiplier symbol will be applied during the at least one play of the second electronic game, controlling display of a subset of the number of multiplier symbols in a second display area, the subset of the number of multiplier symbols including remaining multiplier symbols of the number of multiplier symbols associated with remaining multiplier values to be applied in at least one future play of the second electronic game, controlling display of at least one outcome for the at least one play on a plurality of reels in a third display area wherein the at least one outcome is associated with at least one output amount, applying the multiplier value associated with the multiplier symbol to the at least one output amount to generate a multiplied at least one output amount, providing the at least one output amount, and controlling display of a next multiplier symbol of the subset of the number of multiplier symbols in the second display area to indicate that the multiplier value associated with the next multiplier symbol will be applied in a next at least one play of the second electronic game.

There is disclosed a gaming device, a method of operating a gaming device and a system with hold and spin game instances that award a set of multipliers for further game instances. In an example, selected multiplier symbols are held during the hold and spin game instances. The multipliers shown on multiplier symbols are selected by the end of the hold and spin game instances are used in a series of further game instance having a number of game instances corresponding to the selected number of multiplier symbols. One multiplier is used in each further game instance by being applied to any winning outcomes of the respective game instance.

In an example, the hold and spin game instances can be triggered from a base game instance. In an example, multiplier increment symbols can be selected during base games that result in multiplier totals being updated. If a multiplier increment symbol is selected when the hold and spin game instances are trigged, a multiplier symbol having the total is awarded and held in place during the hold and spin game instances.

An example embodiment describes a gaming device comprising a display, a random number generator, a processor, and a memory storing instructions. When the instructions are executed by the processor, they cause the processor to conduct hold-and-spin game instances until an end condition is met, wherein each hold-and-spin game instance comprises selecting from hold-and-spin reel strips using the random number generator, each hold-and-spin reel strip having a plurality of reel strip positions, wherein one or more of the reel strip positions of each hold-and-spin reel strip has a multiplier symbol, the selecting being in respect of each symbol position of a set of symbol positions not already occupied by a multiplier symbol, controlling the display to display an outcome of the selecting, and holding each selected multiplier symbol for each subsequent game instance of the hold-and-spin game instances. Upon the end condition being met, the instructions cause the processor to (i) award a number of further game instances based on a number of multiplier symbols displayed at the end of the hold-and-spin game instances, and (ii) award a set of multipliers to be applied during the number of further game instances based on multiplier values displayed on the multiplier symbols at the end of the hold-and-spin game instances, and conduct at least the awarded number of further game instances, wherein in each awarded further game instance, one of the awarded multipliers is applied to any winning outcome of the respective further game instance.

Another example embodiment describes a method of operating a gaming device comprising a display, and a random number generator. The method comprising conducting hold-and-spin game instances until an end condition is met, wherein each hold-and-spin game instance comprises selecting from hold-and-spin reel strips using the random number generator, each hold-and-spin reel strip having a plurality of reel strip positions, wherein one or more of the reel strip positions of each hold-and-spin reel strip has a multiplier symbol, the selecting being in respect of each symbol position of a set of symbol positions not already occupied by a multiplier symbol, controlling the display to display an outcome of the selecting, and holding each selected multiplier symbol for each subsequent game instance of the hold-and-spin game instances. Upon the end condition being met, the method comprises (i) awarding a number of further game instances based on a number of multiplier symbols displayed at the end of the hold-and-spin game instances, and (ii) awarding a set of multipliers to be applied during the number of further game instances based on multiplier values displayed on the multiplier symbols at the end of the hold-and-spin game instances. The method comprises conducting at least the awarded number of further game instances, wherein in each awarded further game instance, one of the awarded multipliers is applied to any winning outcome of the respective further game instance.

Another example embodiment describes a system comprising at least one display, a random number generator, one or more processors, and at least one memory storing instructions. When the instructions are executed by the one or more processors, they cause the one or more processors to conduct hold-and-spin game instances until an end condition is met, wherein each hold-and-spin game instance comprises selecting from hold-and-spin reel strips using the random number generator, each hold-and-spin reel strip having a plurality of reel strip positions, wherein one or more of the reel strip positions of each hold-and-spin reel strip has a multiplier symbol, the selecting being in respect of each symbol position of a set of symbol positions not already occupied by a multiplier symbol, controlling the display to display an outcome of the selecting, and holding each selected multiplier symbol for each subsequent game instance of the hold-and-spin game instances. Upon the end condition being met, the instructions cause the one or more processor to (i) award a number of further game instances based on a number of multiplier symbols displayed at the end of the hold-and-spin game instances, and (ii) award a set of multipliers to be applied during the number of further game instances based on multiplier values displayed on the multiplier symbols at the end of the hold-and-spin game instances; and conduct at least the awarded number of further game instances, wherein in each awarded further game instance, one of the awarded multipliers is applied to any winning outcome of the respective further game instance.

BRIEF DESCRIPTION OF THE DRAWINGS

FIG. 3 illustrates an example reel strip layout.

DETAILED DESCRIPTION

Figure 1:
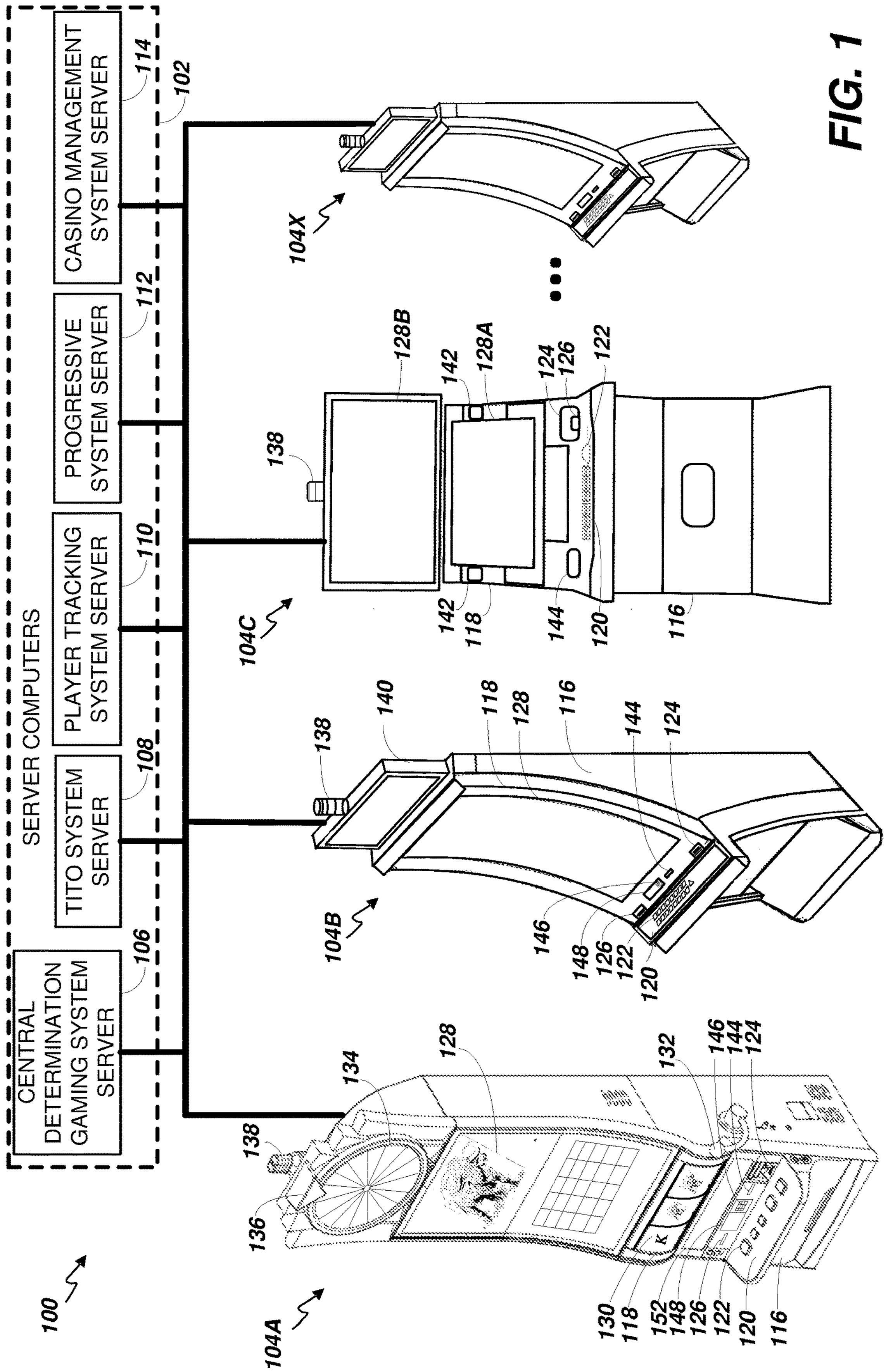
FIG. 1 is an exemplary diagram showing several EGMs networked with various gaming related servers.

In the example embodiment, systems and methods for accumulation and application of electronic gaming enhancements (e.g., multipliers) are provided. For example, hold and spin game instances that award a set of multipliers for further game instances are provided. Selected multiplier symbols are held during the hold and spin game instances. The multipliers shown on multiplier symbols at the end of the hold and spin game instances are used in a series of further game instances having a number of game instances corresponding to the selected number of multiplier symbols (e.g., nine multipliers corresponds to nine free games). One multiplier is used in each further game instance by being applied to any winning outcomes of the respective game instance.

The hold and spin game instances can be triggered from a base game instance. In an example, multiplier increment symbols can be selected during base games that result in multiplier totals being updated. If a multiplier increment symbol is selected when the hold and spin game instances are trigged, a multiplier symbol having the total is awarded and held in place during the hold and spin game instances.

The technical problems addressed herein include at least one of: (i) inability of known systems to increment and accumulate multipliers for use in a later game while controlling RTP; (ii) inability of known systems to efficiently communicate accumulation and application of multipliers; (iii) inability of known systems to increment multipliers that may be applied in electronic games; and (iv) inability of known systems to randomly determine an order in which predetermined multipliers will be applied across a number of game instances while controlling RTP.

The resulting technical effects and/or technical benefits achieved by this disclosure include at least one of: (i) ability to increment and accumulate multipliers for use in a later game while controlling RTP; (ii) ability to efficiently communicate accumulation and application of multipliers (e.g., including on screens of limited size such as mobile device screens); (iii) ability to increment multipliers that may be applied in electronic games; (iv) ability to randomly determine an order in which predetermined multipliers will be applied across a number of game instances while controlling RTP; (v) displaying large quantities of complex information in a relatively small display area; (vi) communicating complex information with easy-to-understand animations on a display; (vii) clearly indicating when a player has entered a bonus game; (viii) efficiently communicating different game rules for the bonus game on the display during game play; and (ix) providing versatility as to which devices (e.g., EGMs, mobile devices, etc.) the games described herein may be played on because of the efficient display area designs described herein.

Various interface improvements are provided herein to efficiently and effectively communicate information. For instance, while advancement toward and during play a number of free games, as described herein, various animations are provided to communicate incrementation of multipliers, accumulation of multipliers, and a status of the advancement toward the number of free games (e.g., a number of spins remaining in the hold and spin game before the free games are provided).

Example embodiments described herein may be provided in combination or in isolation to summarize and present game mechanics in a manner that improves the efficiency of computer systems (e.g., electronic gaming systems including electronic gaming devices). Each example system provides an improved user interface displaying a limited set of information to players, potentially within a small screen, such that players can more quickly understand the current status of the game and navigate to the next play of the game. The systems and methods provide improved display device functionality (e.g., on a gaming device) by providing multiple visual indicators that communicate game mechanics described herein to players. The systems and methods provided herein also improve display and device efficiency by eliminating the need for complex information pages describing game mechanics to players. Because of at least the easily-understood animations, symbols, and indicators displayed, the games described herein can be played and understood on a single screen substantially smaller than some of the EGMs described herein (e.g., a mobile device such as a cell phone), thus removing the need for multiple displays with complex information screens including lengthy text.

Further, different specific lookups may be utilized during play of the example base game described herein in order to properly provide accumulation and application of multipliers while controlling RTP. For instance, a weighted table (such as that shown in Table 1) may be stored in memory to determine what type of symbol should be configured at each symbol position for an instance of a game. In an example, certain weightings may be applied so that it is much more likely that a gold configuring symbol (e.g., a multiplier symbol that does not result in incrementation of a multiplier, such as the green, red, or purple multipliers described herein) will be selected for a reel strip position than a different configuring symbol.

Further, a specific configuring symbol for each type of symbol may be selected using an RNG and further weighted tables. In this example, gold configuring symbols are selected from a first subset of configuring symbols having ×2, ×3, ×5, ×8, ×18, ×28, ×38 multiplier symbols and a Major Jackpot symbol. That is, gold configuring symbols can be one of seven different multiplier symbols having different multiplier values or a Major Jackpot symbol. Weightings are assigned based on desired RTP but in general lower multiplier symbols will have higher weightings. Any red, green or purple configuring symbols are selected from a second subset of configuring symbols having +2, +3, +5, +8, +18, +28 or +38 multiplier increment symbols. Again, weightings are related to the size of the multiplier increment and the desired RTP from this component.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming device 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in gaming device 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
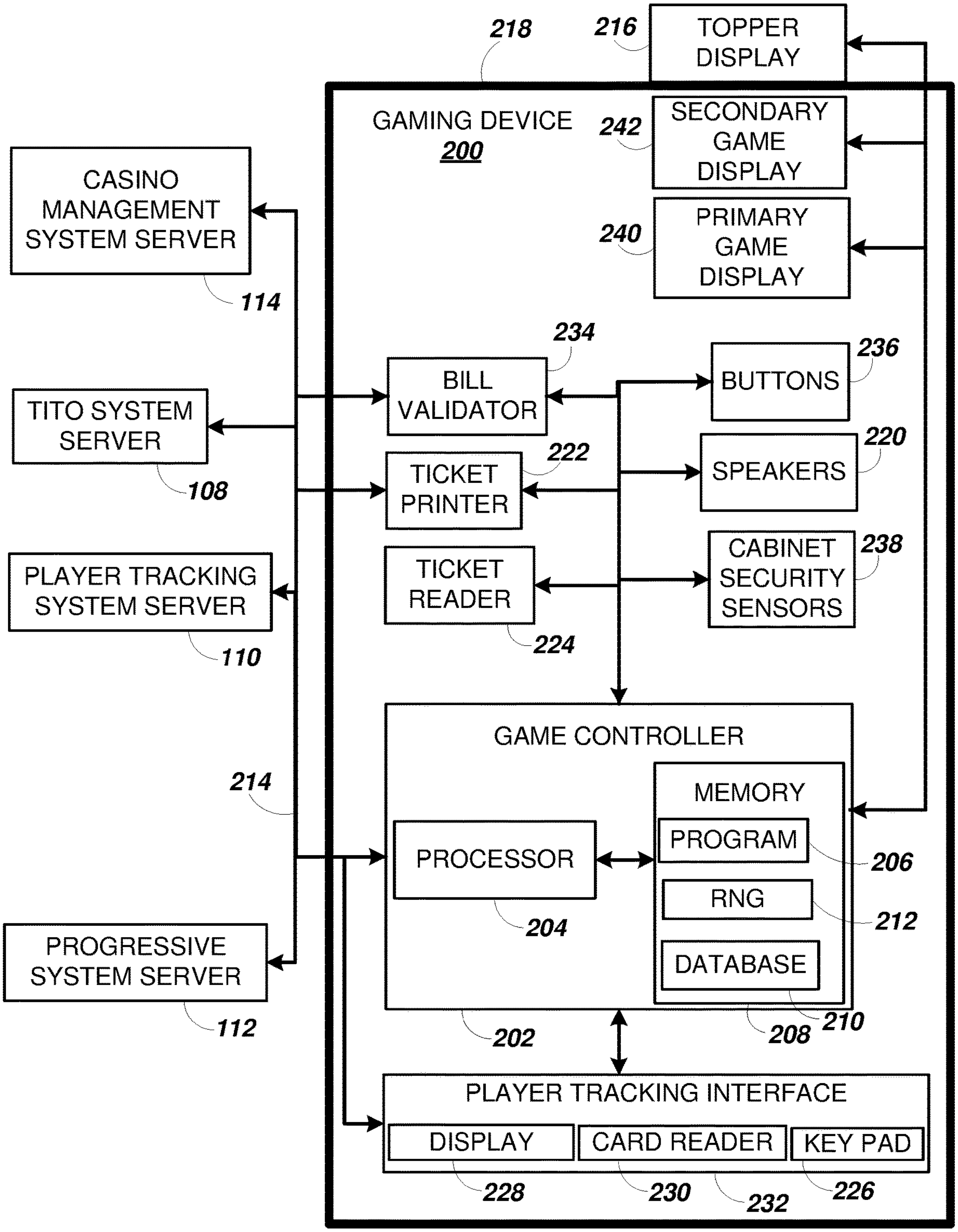
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (e.g., a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 104A-104X, 200) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a credit input mechanism such as a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The credit balance may be stored in a meter in memory 208 (or in a separate hardware meter). In some embodiment, memory 208 implements a credit meter to monitor to the credit balance and has a win meter that monitors any amounts won during any game instance(s) resulting from the wager. The balance of the win meter is transferred to the credit meter prior at the conclusion of the game instances. The player may also optionally insert a loyalty club card into the card reader 230. In some embodiments, the loyalty club card may also act as a credit input mechanism, by allowing a player to transfer funds from a centrally stored balance in order to establish a credit balance. During the game, the player views the game outcome on the game displays 240, 242. Other game and prize information may also be displayed.

When the player is done, he/she cashes out the credit balance (typically by pressing a cash out button to receive a ticket from the ticket printer 222). The ticket may be "cashed-in" for money or inserted into another machine to establish a credit balance for play.

Figure 5:
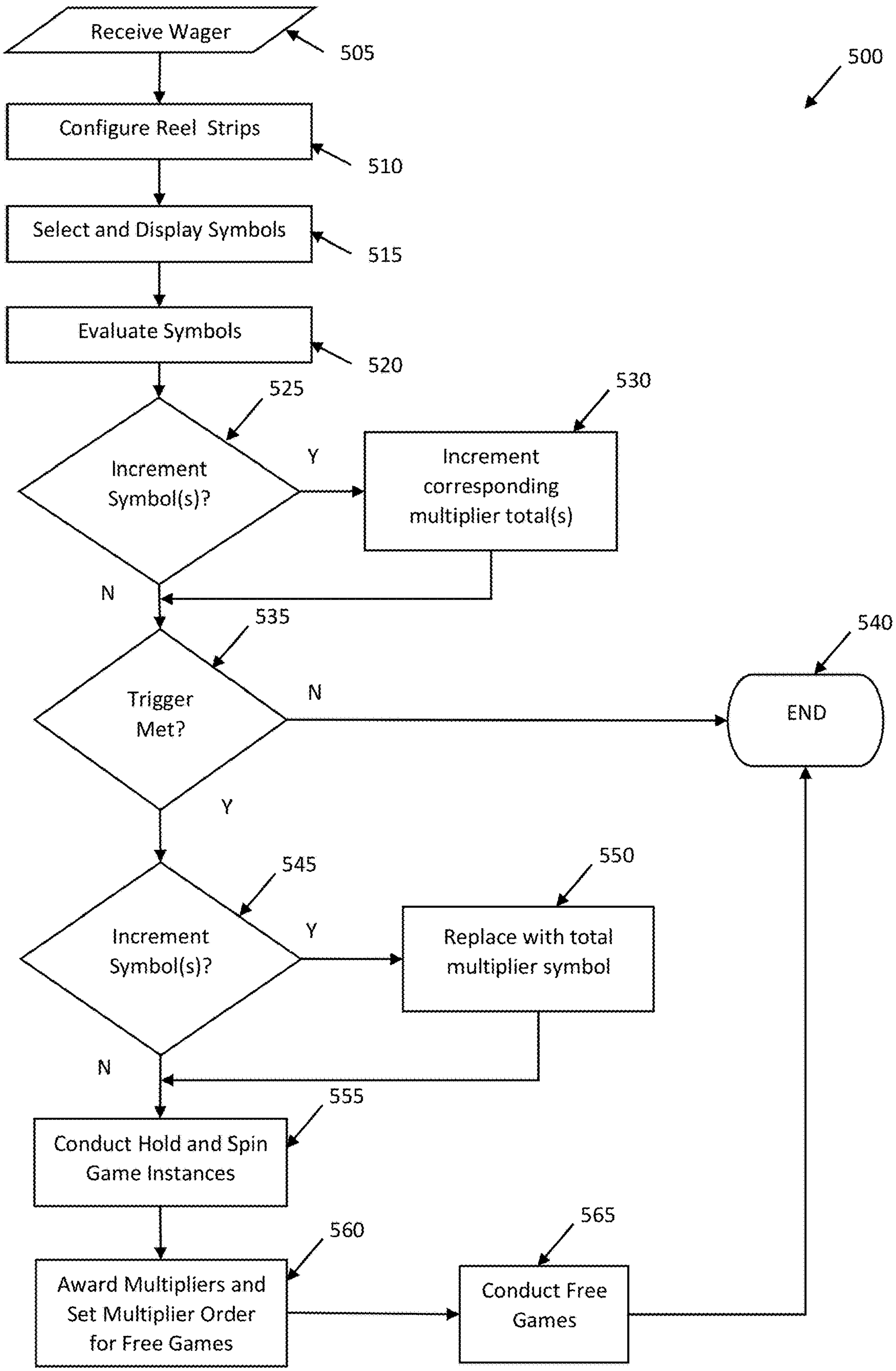
FIG. 5 is a flow chart of a method of operating a gaming device.

FIG. 5 is a flow chart of an example embodiment of a method 500 of operating a gaming device. At step 505, the processor 204 initiates a first game instance (e.g., a base game) in response to receiving a wager (e.g., in response to a player making a wager selection using buttons as described above).

At step 510, the processor 204 configures the reel strips for a current game instance, in this respect, FIG. 3 illustrates an example of a set 300 of five-reel strips 341, 342, 343, 344, 345. In the example, for illustrative purposes, twenty-five-reel strip positions 301-325 are shown for each reel strip 341-345. Each reel strip position of each reel has a symbol. For example, a "Wild" symbol occupies the twenty-first reel strip position 321 of the fourth reel 344. The symbols shown on the reel strip are generally indicative of symbols that may be employed in the embodiments but it will be appreciated that their visual appearance and the composition will depend on factors such as the visual theme of the game and desired return to player. That is, other reels strips to those illustrated in FIG. 3 can be used, for example, reel strips where two or more wild symbols are placed at consecutive reel strip positions of a reel strip. Symbol position 330 indicates that the reel strips 341-345 may have more symbols than illustrated. For example, the reel strips 341-345 could have between 30 and 100 reel strip positions with the last reel strip position of a respective reel strip being treated as contiguous with the first reel strip position 301 as would be the case with a mechanical reel. The actual lengths of the game reel strips depend on factors such as the number of wild symbols (in general, the more wilds there are, the longer the reel strip needs to be to maintain the target RTP), and volatility (in general, the higher the prize value is, the longer the reel strip needs to be to lower the hit rate to maintain the target RTP). In some examples, the reel strips associated with different columns may be of different lengths to one another.

In the examples, the reel strips include a plurality of configurable symbol positions, here designated as "SCAT" (e.g., at the sixth symbol position 306 of the first and second reel strips 341,342), and these symbol positions are configured at step 510 by processor 204 with configuring symbols as part of each base game instance. That is, in this example, the reel strips are configured for each base game instance.

In this example, the reel strips are configured in a two-part process. In a first part, processor 204 determines, for each configurable symbol position, whether it should be populated by a multiplier increment symbol of the configuring symbols or from another subset of the configuring symbols. As will be explained in further detail below, when a multiplier increment symbol is selected in a base game instance, the processor 204 increments a corresponding multiplier total stored in memory 208 by a value represented by the multiplier increment symbol. If a multiplier increment symbol is displayed when processor 204 determines that a trigger condition is met, the processor 204 awards a multiplier corresponding to the current multiplier total as explained further below.

In this example, three separate multiplier totals are maintained in memory 208 by processor 204 and the totals displayed on display 240 are visually distinguished by different colors that are shared with the multiplier increment symbols. In this example, there are red multiplier increment symbols, green multiplier increment symbols and purple multiplier increment symbols. All other configuring symbols are gold colored to distinguish them from the multiplier increment symbols. It will be understood that symbols can be distinguished by other visual characteristics.

Accordingly, in this example processor 204 conducts a random determination using RNG 212 and a weighted table (such as that shown in Table 1) stored in memory 208 to determine what type of symbol should be configured at each position.

TABLE 1

| Symbol Type | Weighting |
|---|---|
| Gold | Weighting 1 |
| Red | Weighting 2 |
| Green | Weighting 3 |
| Purple | Weighting 4 |

In an example, Weightings 2, 3 and 4 are the same but much less than Weighting 1 so that it is much more likely that a gold configuring symbol will be selected for a reel strip position.

In a second part of the configuring process, processor 204 selects a specific configuring symbol for each type of symbol using RNG 212 and further weighted tables. In this example, gold configuring symbols are selected from a first subset of configuring symbols having ×2, ×3, ×5, ×8, ×18, ×28, ×38 multiplier symbols and a Major Jackpot symbol. That is, gold configuring symbols can be one of seven different multiplier symbols having different multiplier values or a Major Jackpot symbol. Weightings are assigned based on desired return to player but in general lower multiplier symbols will have higher weightings. Any red, green or purple configuring symbols are selected from a second subset of configuring symbols having +2, +3, +5, +8, +18, +28 or +38 multiplier increment symbols. Again, weightings are related to the size of the multiplier increment and the desired return to player from this component.

Below, the multiplier symbols and multiplier increment symbols are also referred to as multiplier on reel ("MOR") symbols.

Figure 8:
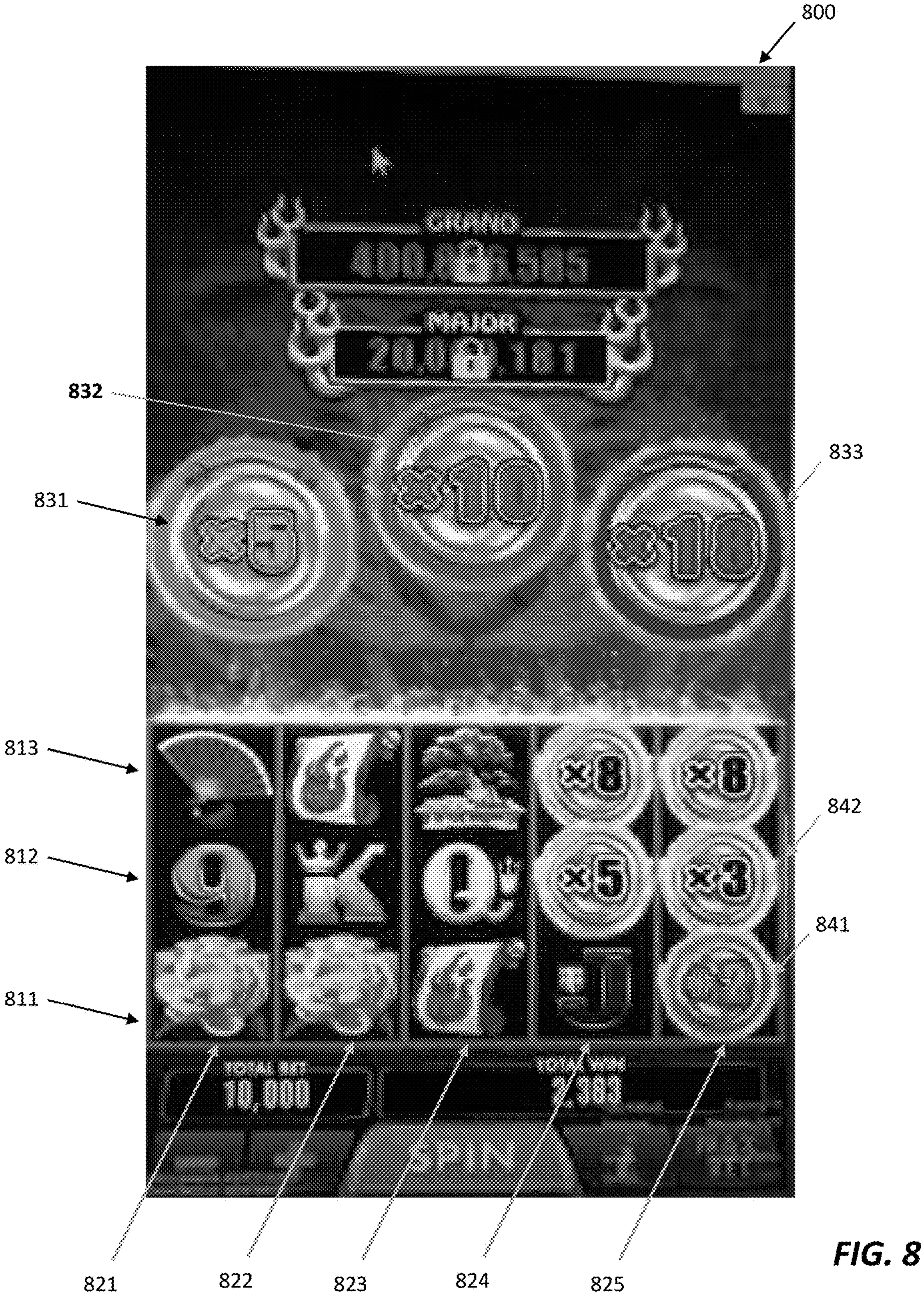
FIGS. 8 to 31 illustrate example screenshots and/or interfaces showing accumulation and application of electronic gaming enhancements, in accordance with the present disclosure.

At step 515, the processor 204 selects symbols for a spinning reel game using the configured reel strips and controls the display 240 to display the selected symbols. FIG. 8 shows an example screen display 800 of a base game where symbols are selected from five configure reel strips for display in five columns of symbol positions 821-825 with three symbols being selected from each reel strip such that there are also three rows 811-813 of symbol positions.

Figure 4:
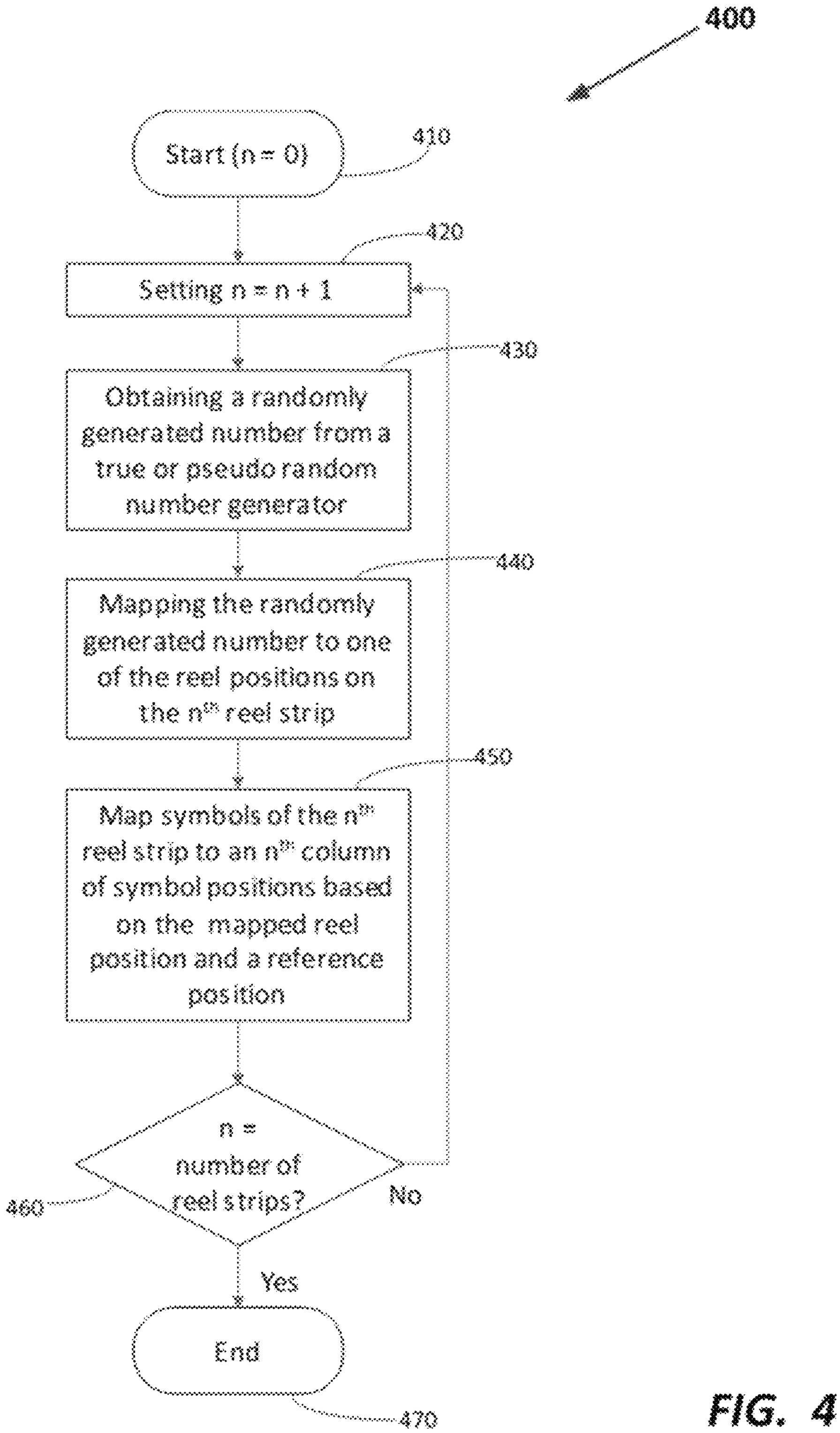
FIG. 4 is a flow chart of a symbol selection method.

FIG. 4 is a flow chart of an example method 400 carried out by the processor 204 to select symbols at step 515 from reel strips configured at step 510. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430, the processor obtains a randomly generated number from a true or pseudo random number generator 212. At step 440 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions.

At step 450, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. Referring to the example reel strips of FIG. 3, if the value returned by the RNG 212 is mapped to reel position 313 when three symbols are being selected from each reel, then for the first reel strip 341, "10" is mapped to a bottom symbol position in bottom row 811, "PIC3" symbol is mapped to a middle symbol position in middle row 812, and "A" symbol is mapped to a top symbol position in top row 813.

At step 460, the processor 204 determines whether symbols have been selected for all of the reel strips, and if not the processor 204 reverts to step 420 and iterates through steps 430, 440 and 450 until it is determined at step 460 that symbols have been selected from all n reel strips and mapped to all n columns of symbol positions after which the symbol selection process ends 470. Different numbers of symbols may be mapped to different numbers of symbol positions.

After the symbols of all reel strips have been mapped to symbol position, the processor 204 controls display 240 to display them at the symbol positions as shown in FIG. 8.

After the symbols are selected, at step 520, the processor 204 evaluates the selected symbols for one or more winning combinations based on a pay table stored in memory 208. In this example, processor 204 applies a "pay line" type evaluation by processing the selected symbols to identify instances of the same symbol appearing one defined pay lines comprising one symbol from of the columns 821-825 starting with (and including) the first column. Upon there being one or more winning combinations, the processor 204 makes an award, for example, by adding credit amounts defined by the pay table and the amount wagered to a win meter or a credit meter in memory 208.

At step 525, processor 204 determines whether the selected symbols include one or more multiplier increment symbols, and if processor 204 makes a positive determination, processor 204 increments the corresponding multiplier total in memory 208 and on the display 240. In this respect, referring again to FIG. 8, example screen display 800 was captured subsequent to symbol selection at step 515 but prior to step 525. As shown in FIG. 8, three current multiplier totals are displayed on a green gong 831 (current multiplier total is ×5), red gong 832 (total=×10) and purple gong 833 (total=×18). In this example, a "+2" multiplier symbol 841 has been selected. Multiplier increment symbol 841 is visually distinguished from gold multiplier symbols such as "×3" multiplier symbol 842 by the color green and the "+" symbol that indicates it is an increment symbol.

Figure 9:
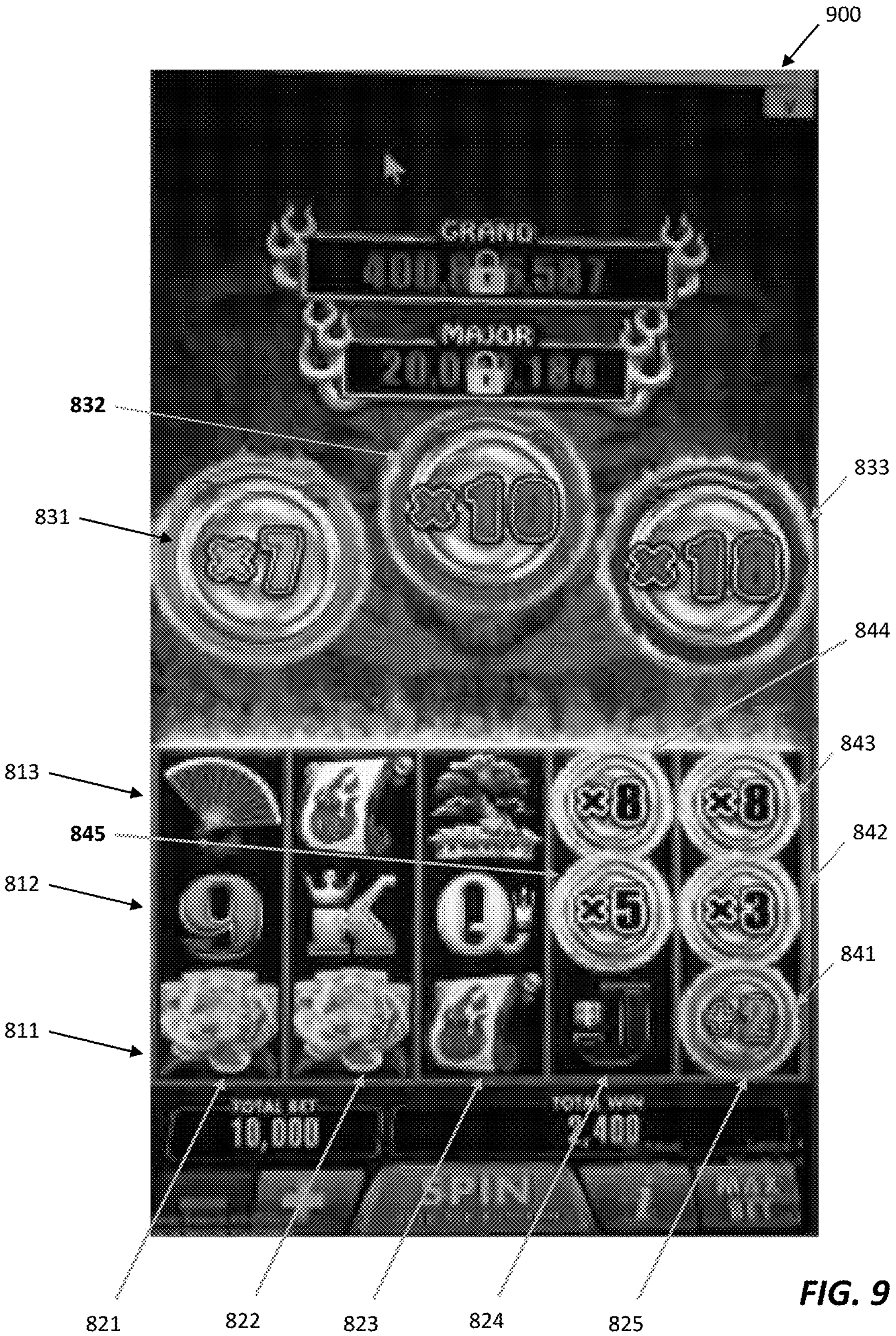

Accordingly, in the example of FIG. 8, processor 204 will make a positive determination at step 525 based on the presence of green multiplier increment symbol 841. Then at step 530, processor 204 will increment the corresponding green gong 831 by incrementing it by the value shown on the multiplier increment symbol 841, here +2. The result of this process is shown in the example screen display of FIG. 9 where green multiplier total on green gong 831 has been updated by adding 2 to ×5 to get a new total of ×7. As explained in further detail below, when one or more of the multiplier totals are awarded, they are reset by processor 204 to a starting value which in an example is zero.

At step 535, the processor 204 determines whether to trigger further game play based on whether the selected symbols include at least a threshold number of MOR symbols. That is, in this example, both multiplier symbols and multiplier increment symbols can contribute to the threshold being met. If the threshold number is not met, the game instance ends at step 540. In this example, the threshold number of MOR symbols is six. Accordingly, taking the example screen display of FIG. 8, processor 204 will make a negative determination at step 535 and end the game at step 540.

Figure 10:
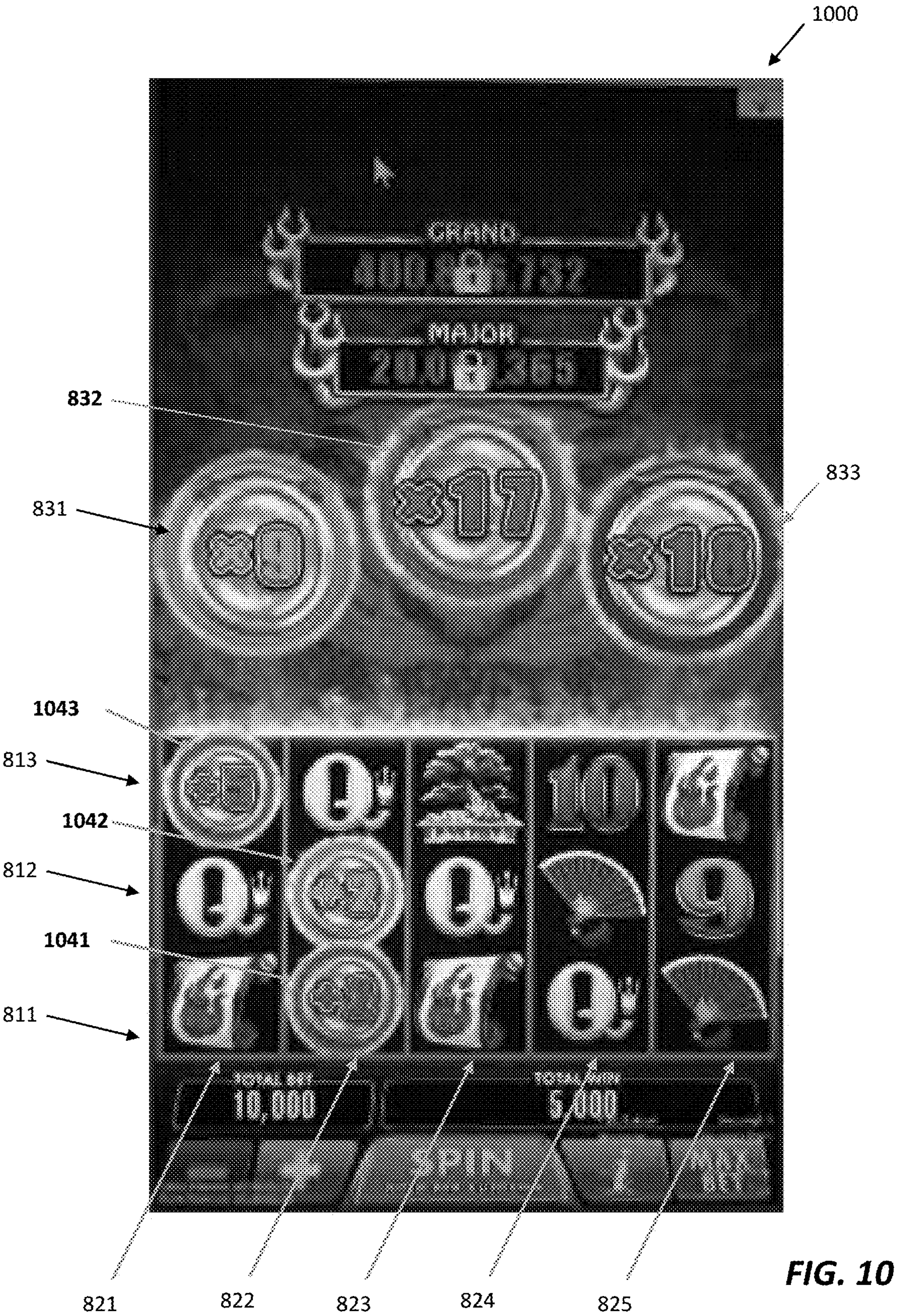

As indicated above, more than one multiplier increment symbol may be selected in one base game instance. FIG. 10 is an example screen display 1000 of a base game instance subsequent to that shown in FIG. 9 where more than one multiplier increment symbol is selected. In example screen display 1000, three multiplier increment symbols 1041-1043 have been selected by processor 204. Accordingly, in this example, processor 204 made a positive determination at step 525 and updated the green gong 831 (as well as the value stored in memory 208) at step 530 by adding 2 to ×7 to get ×9. Similarly, processor 204 has updated the red gong 832 by adding both 2 and 5 to ×10 to get ×17.

Figure 11:
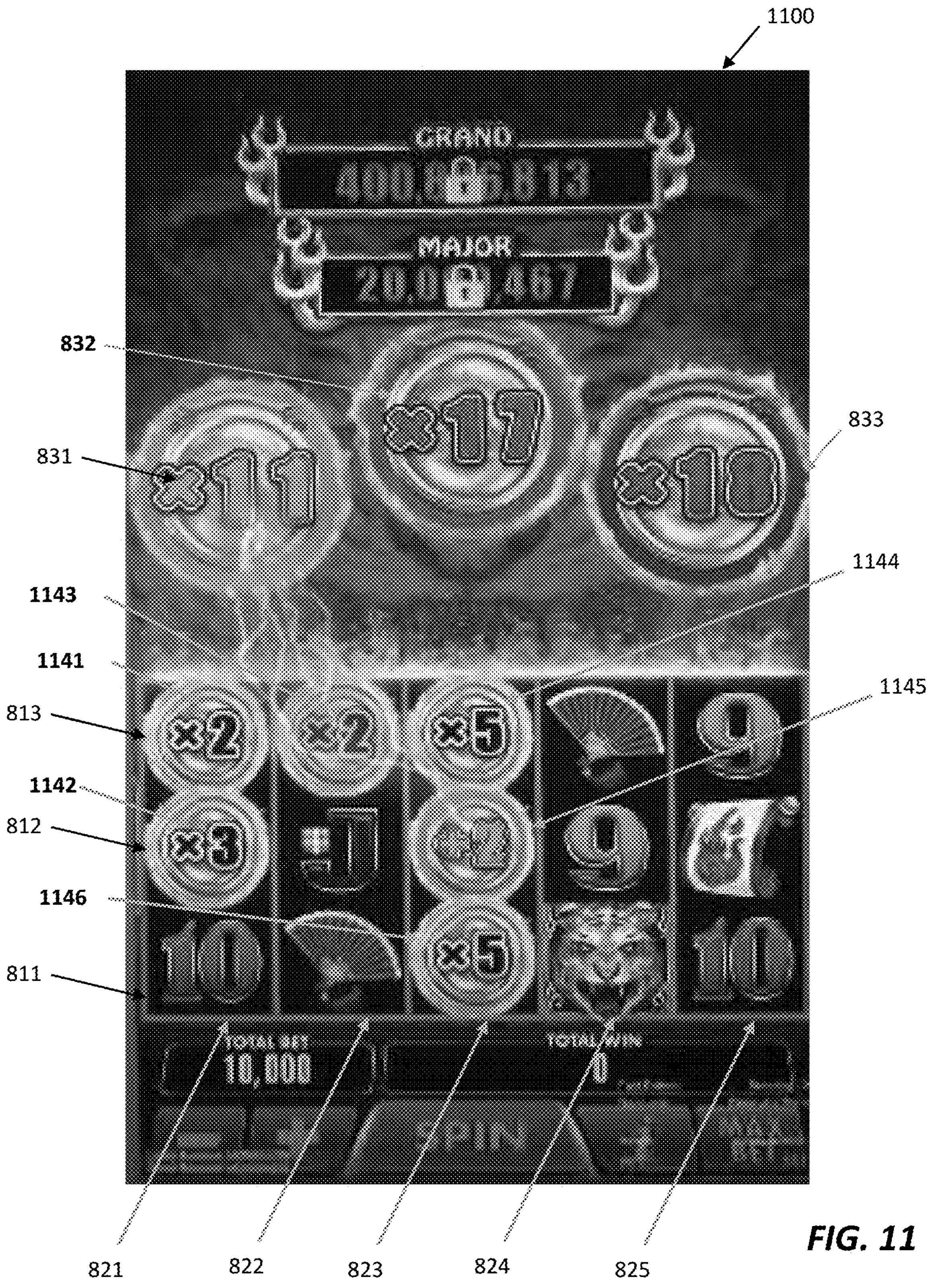

FIG. 11 shows an example screen display 1100 of a subsequent base game instance. In this example screen display six MOR symbols 1141-1146 have been selected by processor 204. The selected MOR symbols include green +2 increment symbol 1145, accordingly processor 204 has updated green gong 831 by adding 2 to ×9 to get ×11.

The processor 204 will respond to the symbol selection shown in FIG. 11 by making a positive determination at step 535. At step 545, processor 204 determines whether the MOR (configuring symbols) that caused the trigger condition to be met include a multiplier increment, and if so, proceeds to step 550 and replaces the increment symbol with a multiplier symbol reflecting the current total associated with the specific increment symbol. In this respect, in the example of screen display 1100, processor 204 will make a positive determination at step 545 and replace the +2 green multiplier increment symbol 1145 with a ×11 multiplier symbol 1145A as seen in example screen display 1200 of FIG. 12 where processor 204 has controlled the display 240 to transition to an initial screen display 1200 of the hold and spin game instances.

Figure 12:
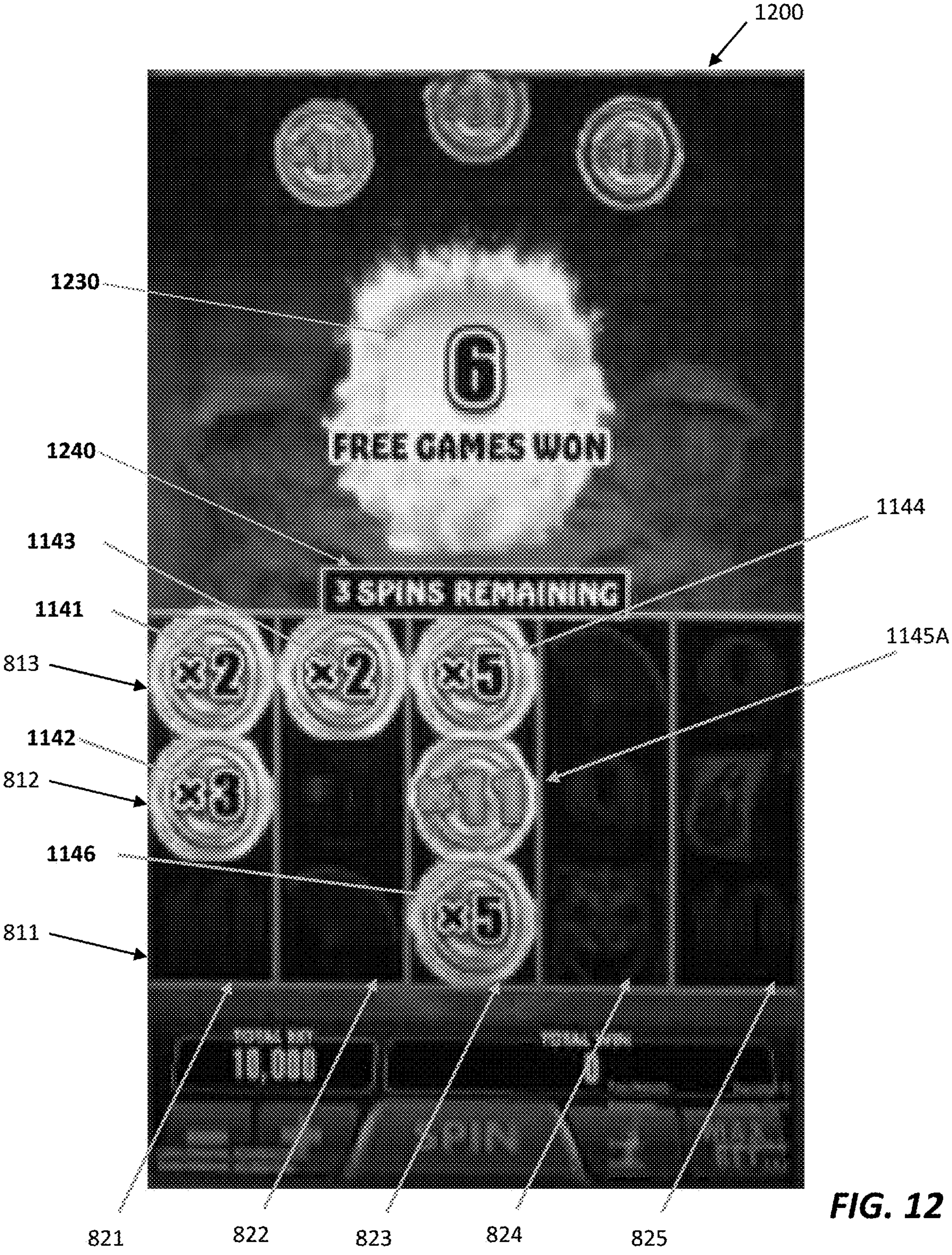

As shown in FIG. 12 processor 204 has held the multiplier symbols 1141-1146 in place from the base game instance of FIG. 11 and greyed-out the remaining symbols to indicate that they are not held. Screen display 1200 also has a free game counter 1230 which currently shows "6 free games won" corresponding to the number of multiplier symbols currently displayed. As explained in further detail below, the number of free games awarded from the hold and spin game instances is based on the number of held MOR symbols at the conclusion of the hold and spin game instances.

Figure 6:
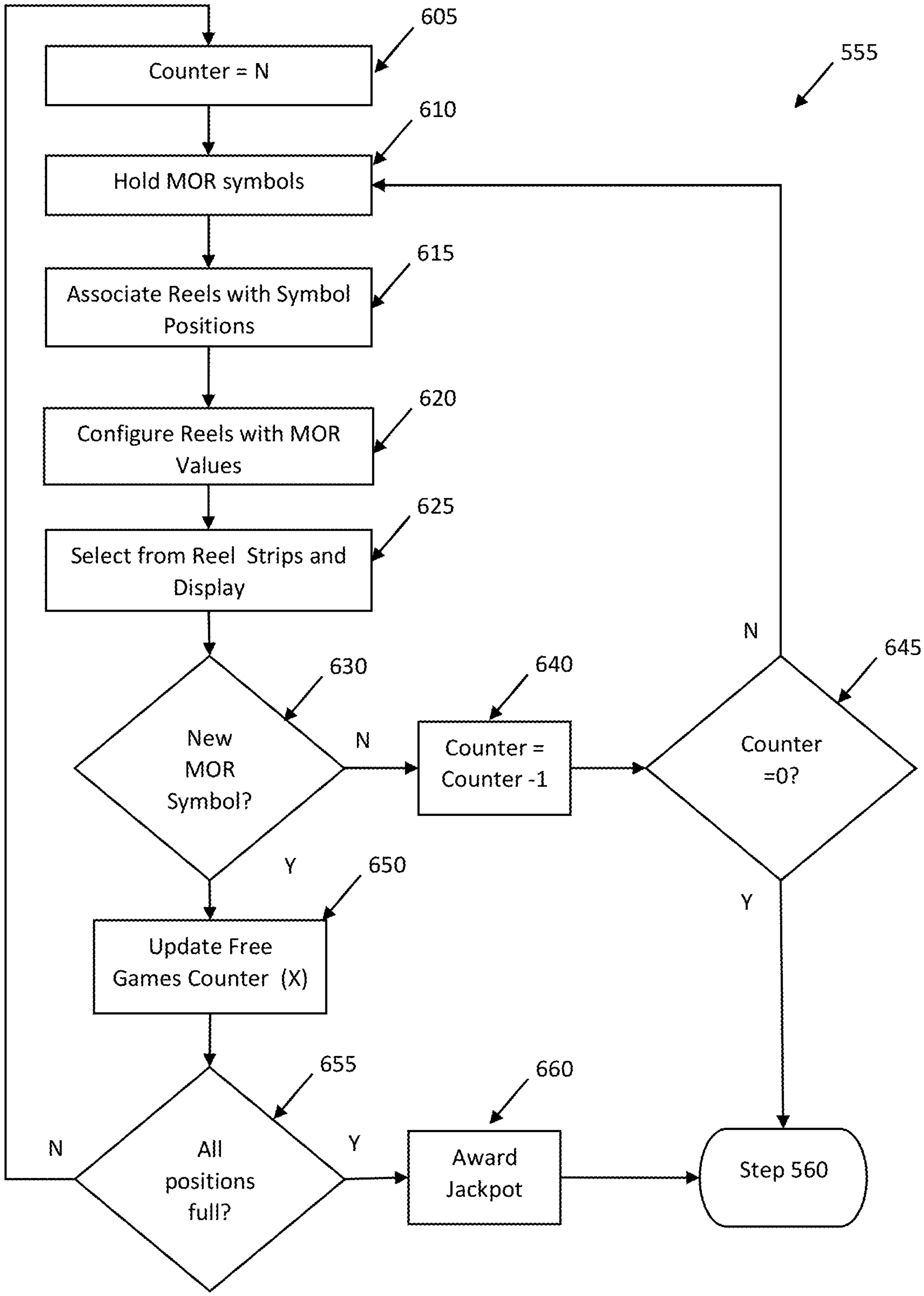
FIG. 6 is another flow chart of a method of operating a gaming device.

FIG. 6 shows an example of a process implemented by processor 204 to conduct 555 a hold and spin game instances.

At step 605, processor 204 sets an initial counter N for the hold and spin games, in this example to three game instances as shown on hold and spin game instance counter 1240. At step 610, the processor 204 holds the multiplier symbols (MOR symbols) in place including the MOR symbols from the base game instance that caused the hold and spin game instances to be awarded. In an alternative example, the MOR symbols may be held for subsequent game instances but moved to specific positions for example, so that the set of display positions is filled in a defined pattern (e.g., top to bottom, left to right).

At step 615, the processor 204 associates reel strips stored in memory with each individual symbol position that is not already occupied with a configurable symbol. In an example, reel strips used by processor 204 at step 615 comprise a mixture of multiplier symbols and blank symbols. In another example, the reel strips include other symbols, but they are greyed out to show that if they are selected they do not count towards the outcome of the hold and spin game instances.

In an example, a first reel strip is used to control the relative probability of all the symbol positions being filled, which in this example, results in a Jackpot being awarded at step 660. In an example, the processor 204 assigns the first reel strip to a symbol position first so that once only one symbol position remains the first reel strip will always be assigned to that symbol position. The first reel strip is typically longer than other reel strips and has very few (or only one) configurable symbol positions in order to control the probability of the Jackpot being awarded at step 660. Processor 204 continues to randomly select symbol positions and assigns reel strips from a separate, second set of reel strips having configurable symbol positions until all symbol positions not occupied by a held multiplier symbol have an associated reel strip.

At step 620, the processor 204 assigns multiplier symbols to the configurable symbol positions using a weighted table in a manner analogous to that described above. In this example, the values of the multipliers on the multiplier symbols can be ×2, ×3, ×5, ×8, ×18, ×28 or ×38 in the hold and spin game instances.

At step 625, the processor 204 selects from the assigned reel strips using a variant of the method described above in relation to FIG. 4. In this example, only a single position is selected from each reel strip which either will or will not have a multiplier symbol. In an example, the processor 204 displays the outcomes of selections from the reel strips at the symbol positions in a random order.

Figure 13:
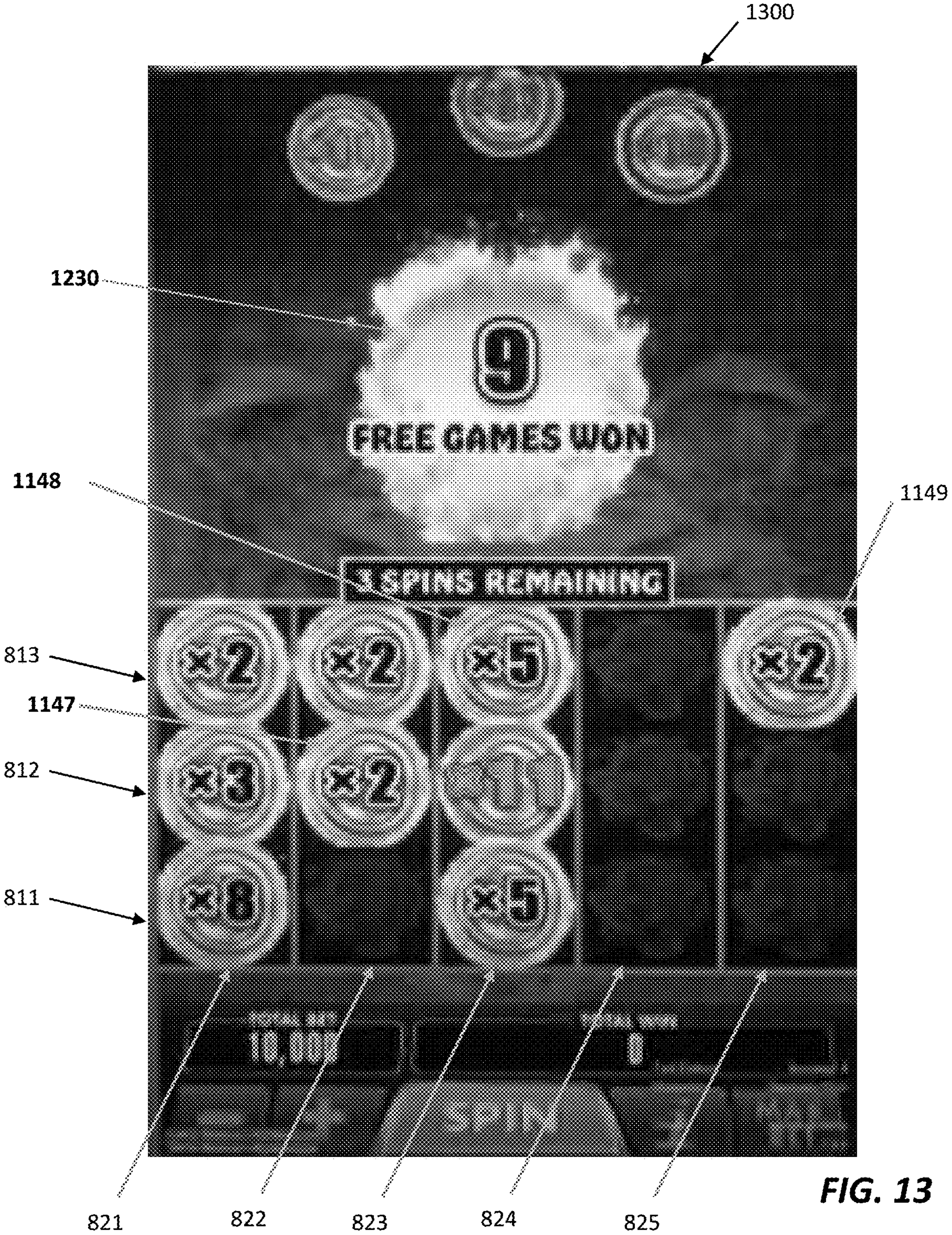

At step 630, the processor 204 determines whether the selection has resulted in one or more new multiplier symbols being selected and if it has, at step 650 processor 204 updates the free games counter (X) in memory 208 and on the display 240 based on the number of new multiplier symbols selected in this game instance. FIG. 13 is an example screen display of an outcome of this process subsequent to FIG. 12 where three additional multiplier symbols 1147, 1148, 1149 have been selected by processor 204 such that at step 650 processor 204 has updated the displayed free games counter to "9 Free Games Won".

At step 655, processor determines whether all symbol positions are occupied with a multiplier symbol. If processor 204 makes a negative determination at step 655, processor 204 reverts to step 605 and resets the counter to N (in this example 3) before iterating through steps 610 to 625 again.

If processor 204 makes a positive determination at step 655 that all symbol positions are occupied with a multiplier symbol, processor 204 awards a Jackpot prize at step 660 before proceeding to step 560.

If at step 630, the processor 204 determines the selection has not resulted in one or more new multiplier symbols being selected, at step 645, the processor 204 determines whether the counter has reached zero. In this way, if a new multiplier symbol is not selected in N consecutive game instances (in this example three game instances), the hold and spin game instances end and the processor 204 proceeds to step 560.

Figure 14:
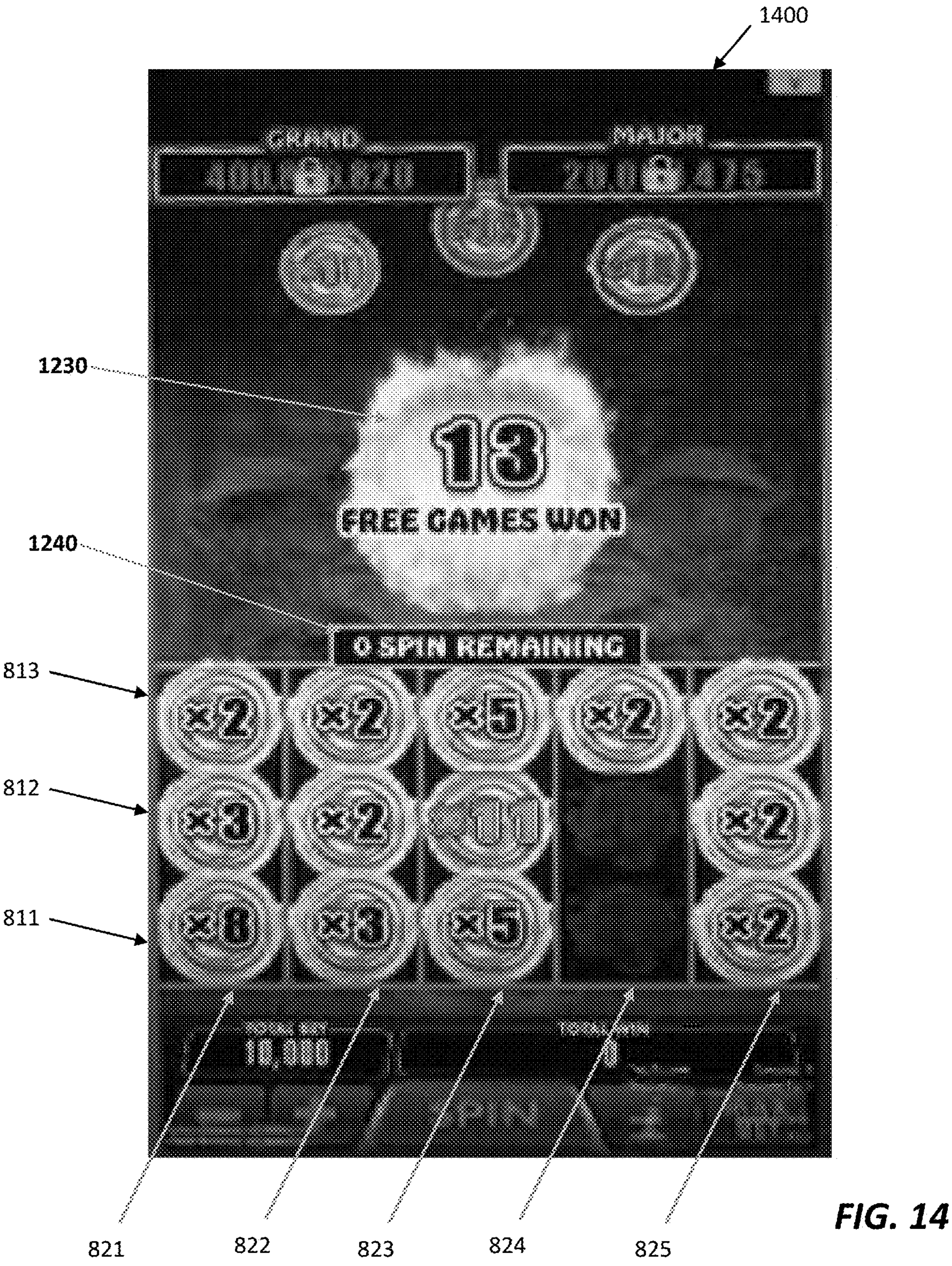

FIG. 14 is an example screen display 1400 at the conclusion of a set of hold and spin game instances where hold and spin game instance counter 1240 has reached "0 Spin Remaining". As indicated by free games counter 1230, the outcome of the hold and spin game instances is "13 Free Games Won".

At step 560, processor 204 awards the multipliers displayed on the multiplier symbols as a set of multipliers to be used in the free games (further game instances). Example screen display 1400 results in the processor 204 awarding the following set of multipliers: ×2, ×3, ×8, ×2, ×2, ×3, ×5, ×11, ×5, ×2, ×2, ×2, ×2. At step 560, processor 204 forms these multipliers into an ordered set by randomly selecting from the set without replacement using RNG 212. The ordered set is then used by processor 204 when conducting the free games. In an alternative example, the processor forms the set of multipliers based on the pattern in which they are displayed at the conclusion of the hold and spin game instances.

Figure 15:
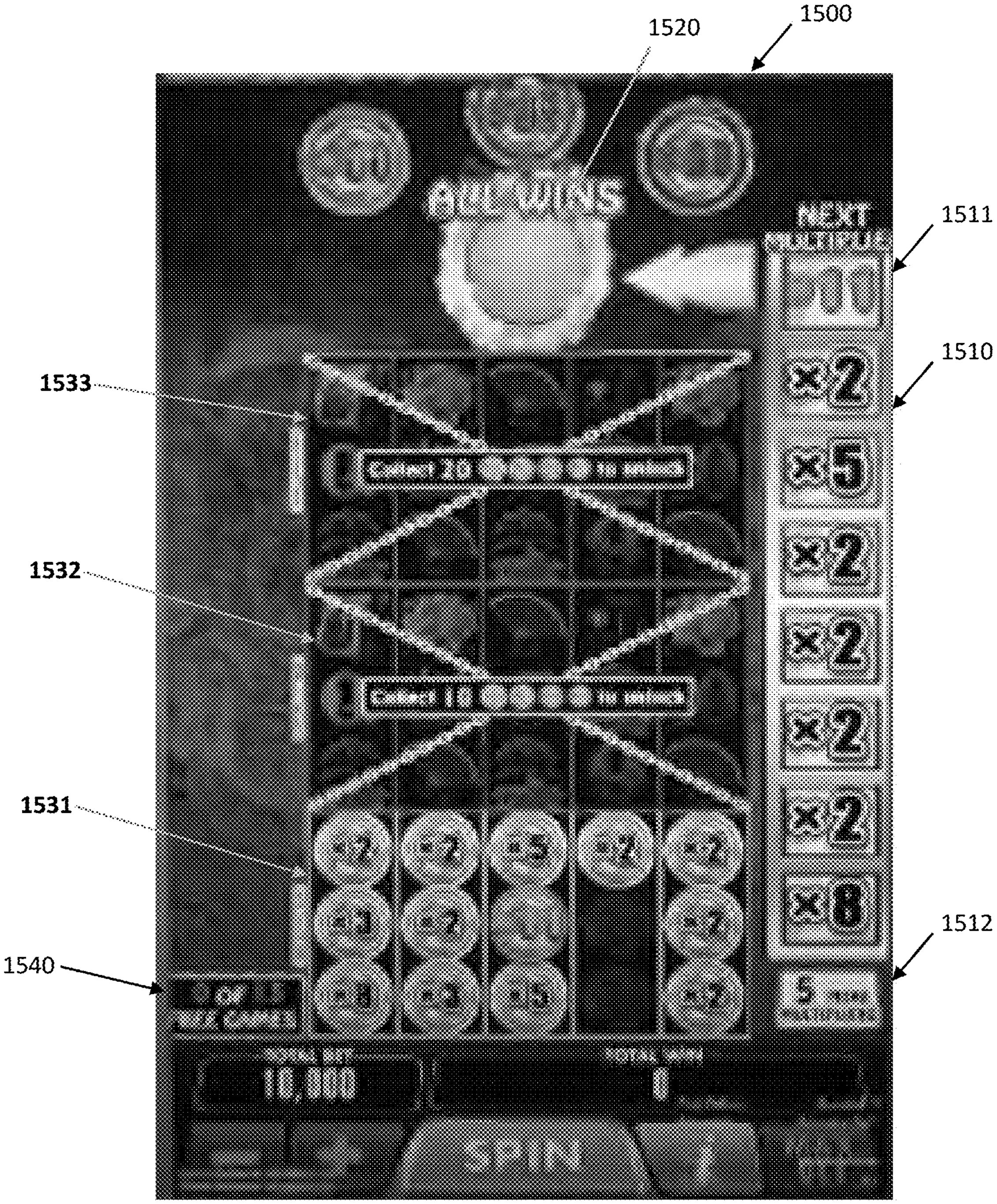

FIG. 15 is an example transitional screen display 1500 from the hold and spin game instances to the free game instances. As shown in FIG. 15, there are three game windows 1531-1533. Bottom game window 1531 shows the same symbols as shown in screen display 1400. On the lefthand side of the screen display 1500 is a free game counter 1540, currently showing that "0 of 13 Free Games" have been conducted as processor 204 has yet to start conducting the free games. On the righthand side of screen display 1500 is a multiplier chute 1510 that shows part of the ordered set of multipliers, in this example the first eight multipliers of the thirteen awarded multipliers, here: ×11, ×2, ×5, ×2, ×2, ×2, ×2, ×8 reflecting the order set by processor 204 at step 560. The top multiplier in the chute (here ×11) is the next multiplier that will be applied—e.g., the multiplier that will be applied in the next free game instance. At the bottom of the chute 1510, there is a game message 1512 indicating how many further multipliers in the ordered set but which are currently not displayed, in this example, "5 More Multipliers" 1512. When the multiplier is being applied, it is moved to current multiplier indicator 1520 as described below.

Figure 7:
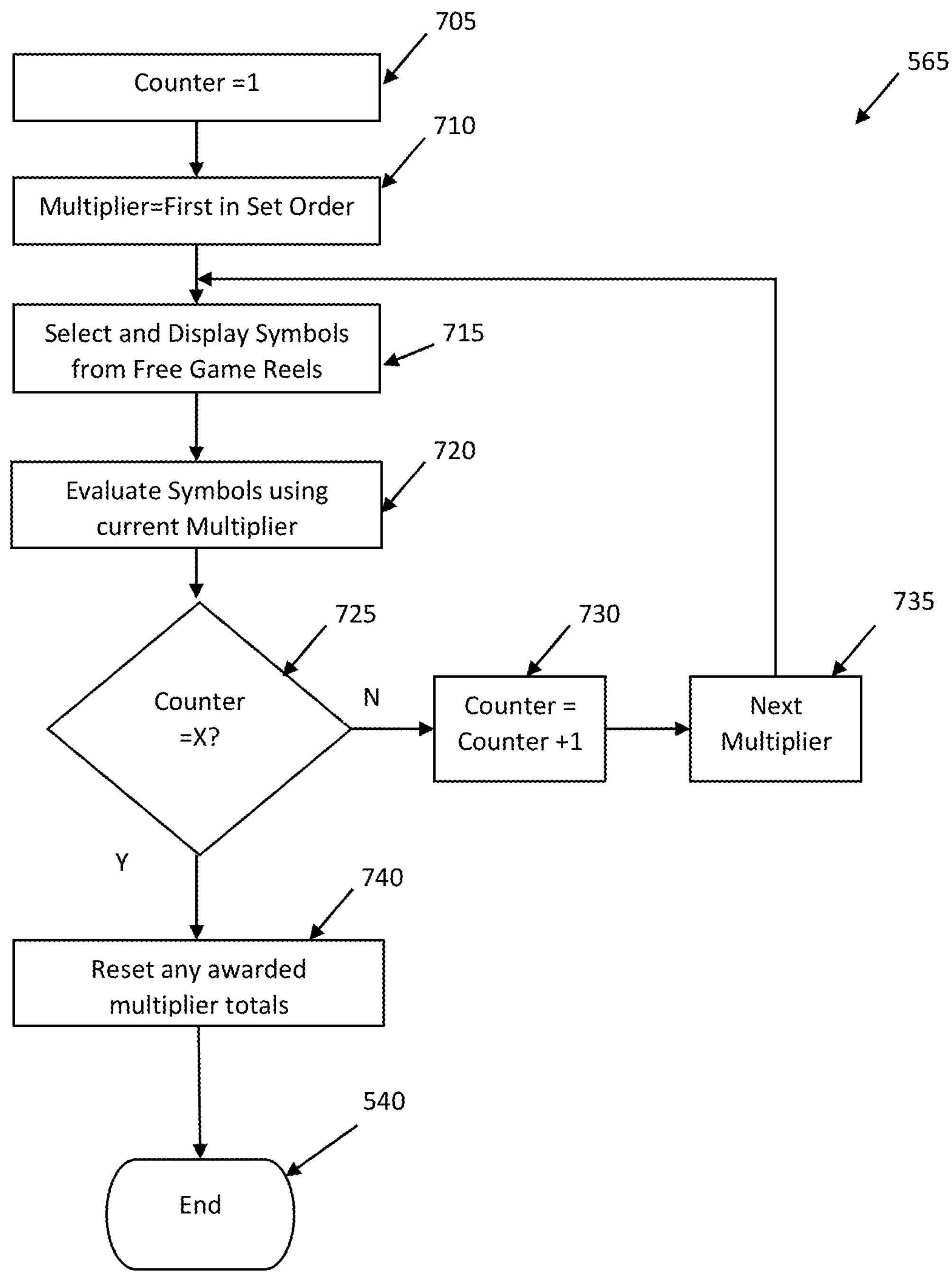
FIG. 7 is another flow chart of a method of operating a gaming device.

After setting the order of the multipliers, processor 204 proceeds to step 565 and conducts the free games as shown in more detail in FIG. 7. At step 705, processor 204 sets a counter to one). At step 710, processor 204 sets the multiplier to the first multiplier of the ordered set of multiplier resulting from step 560. At step 715, the processor selects and displays symbols from free game reel strips using the process described above in relation to base game instances. In an example, the free game reel strips are the same as those used in base game instances and accordingly they are configured prior to each free game instance in a manner analogous to the base game instances. In this example, the set of configuring symbols is different to the base game instance and has ×2, ×3, ×5, ×8, ×18, ×28 or ×38 multiplier symbols. While not shown in FIG. 7, this can result in one or more sets of hold and spin game instances being awarded during the free games using the same mechanism as in the base game. Any such awarded hold and spin game instances are stacked and awarded following completion of the current free game instances following the process described in FIGS. 5 and 6.

Figure 16:
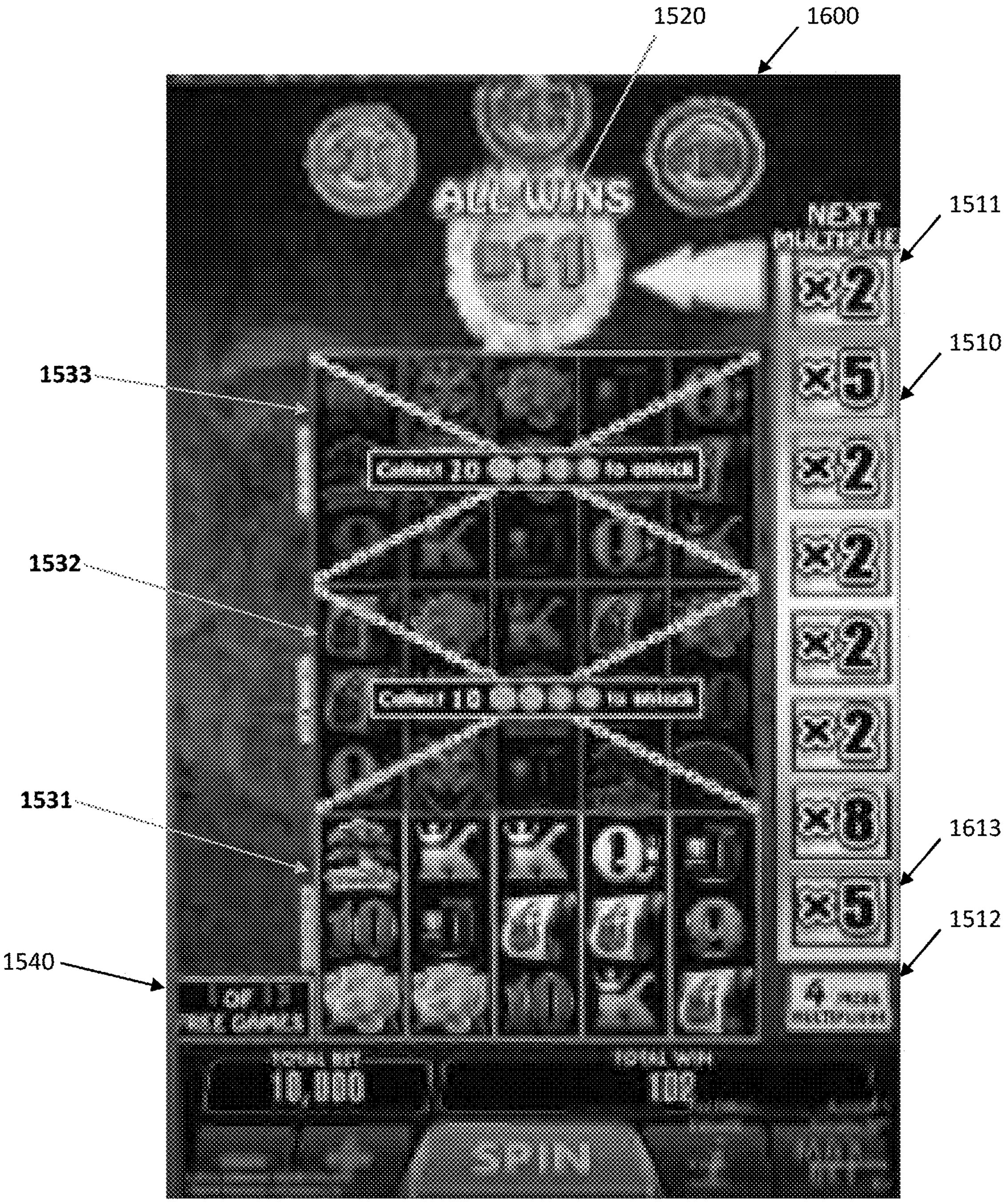

An example of symbols selected in a first free game instance is shown in FIG. 16. In this example, ×11 multiplier has been moved to the current multiplier indicator 1520. This indicates that any winning outcomes in any active game windows 1531-1533 (here just the first game window 1531) of the first free game instance will be multiplied by 11 by processor 204. At step 720, processor 204 evaluates the symbols using a pay table stored in memory 208 and adds the amount of any winning outcomes multiplied by current multiplier to a meter in memory 208.

At step 725, processor 204 determines whether all the free game instances have been conducted—e.g., whether the free game counter has reached the number of awarded free games (in this example 13). If processor 204 makes a negative determination at step 725, processor 204 increments the counter by one at step 730 and advances the queue of multipliers at step 735. In this example, the next multiplier 1511 will be a ×2 multiplier. It will also be observed from FIG. 16 that multiplier chute 1510 has been updated with ×5 multiplier being advance to bottom position 1613 and game message 1512 update to indicate that 4 More Multipliers" are currently not displayed.

Figure 17:
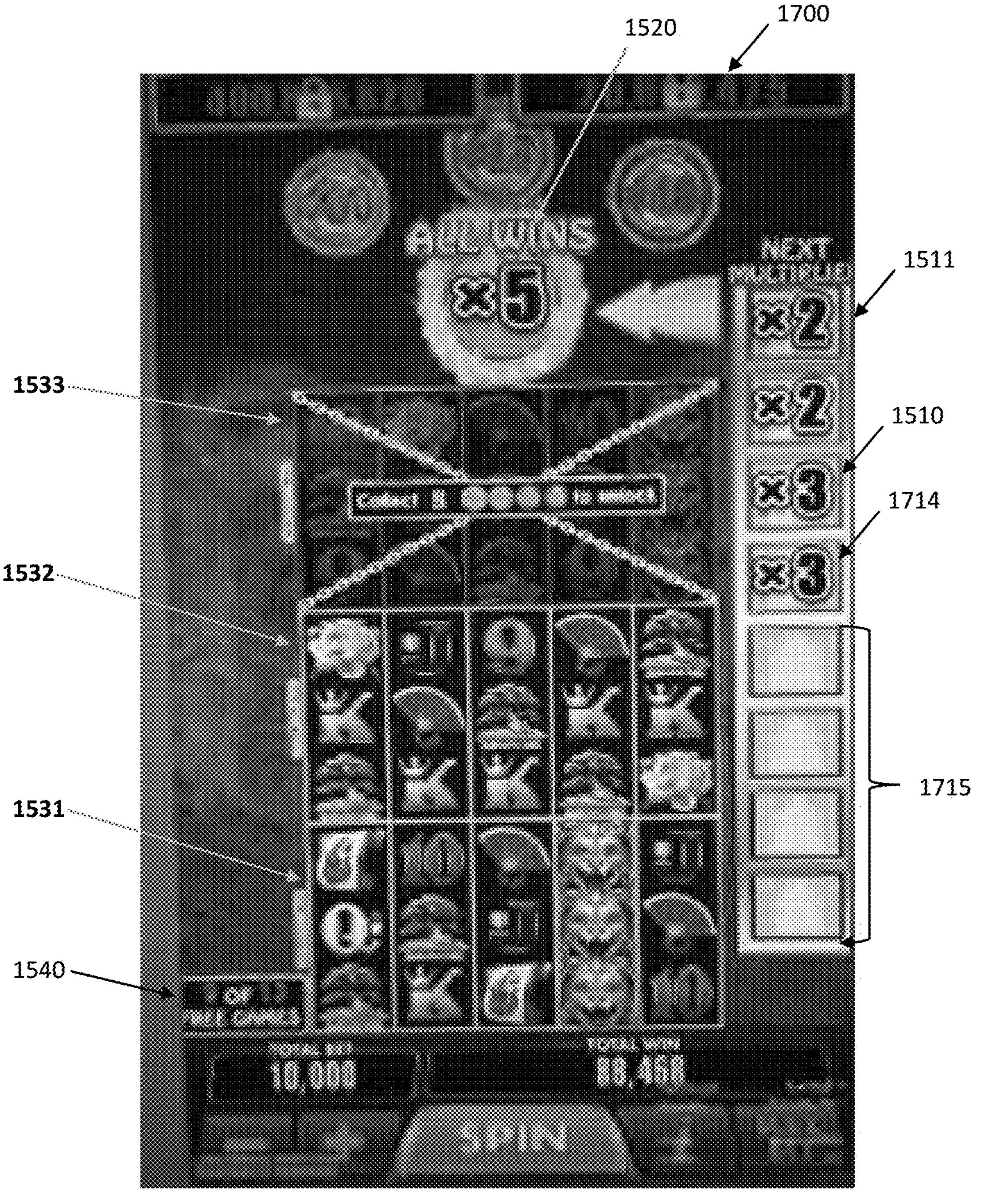
Figure 18:
Figure 19:
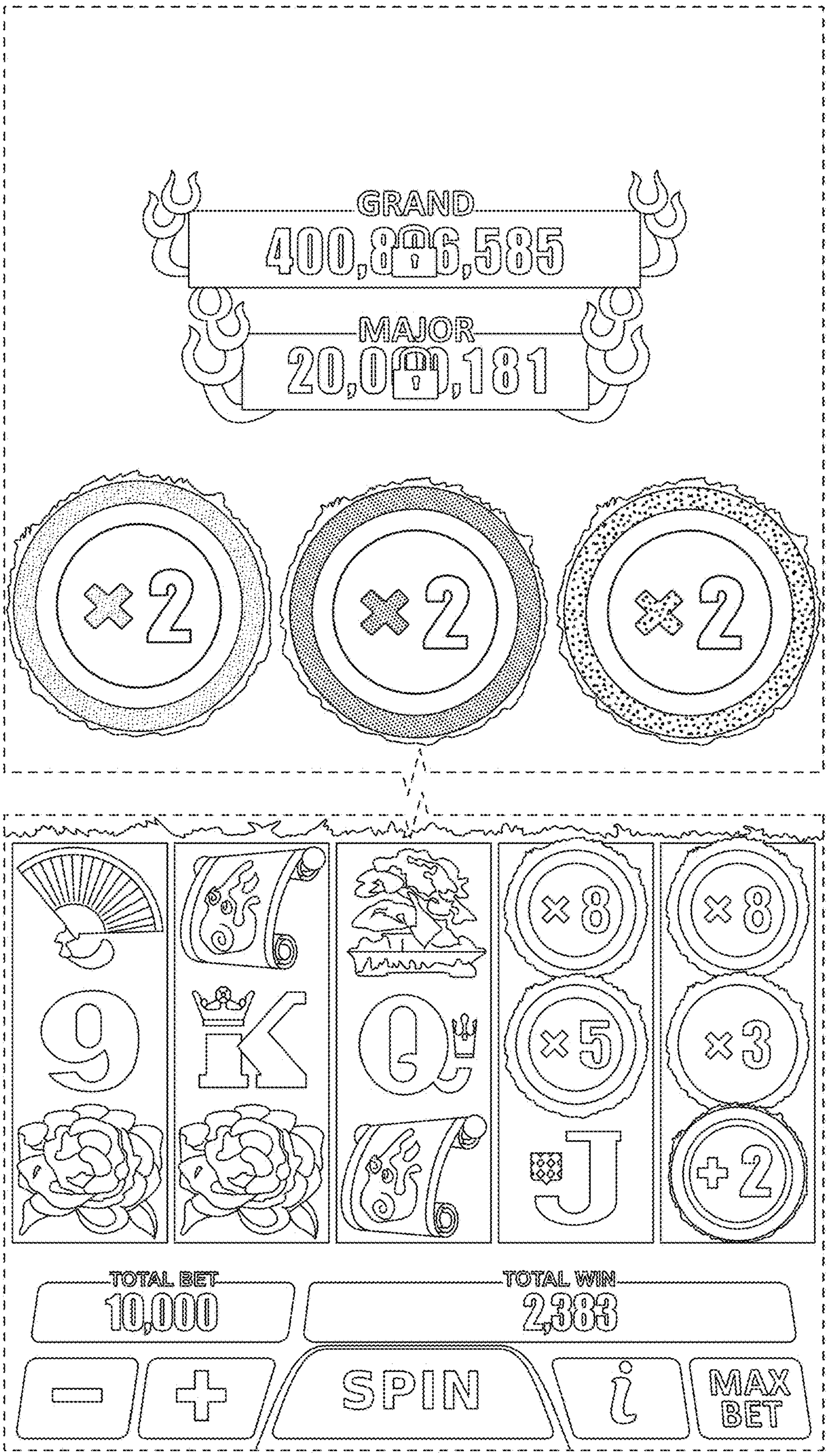
Figure 20:
Figure 21:
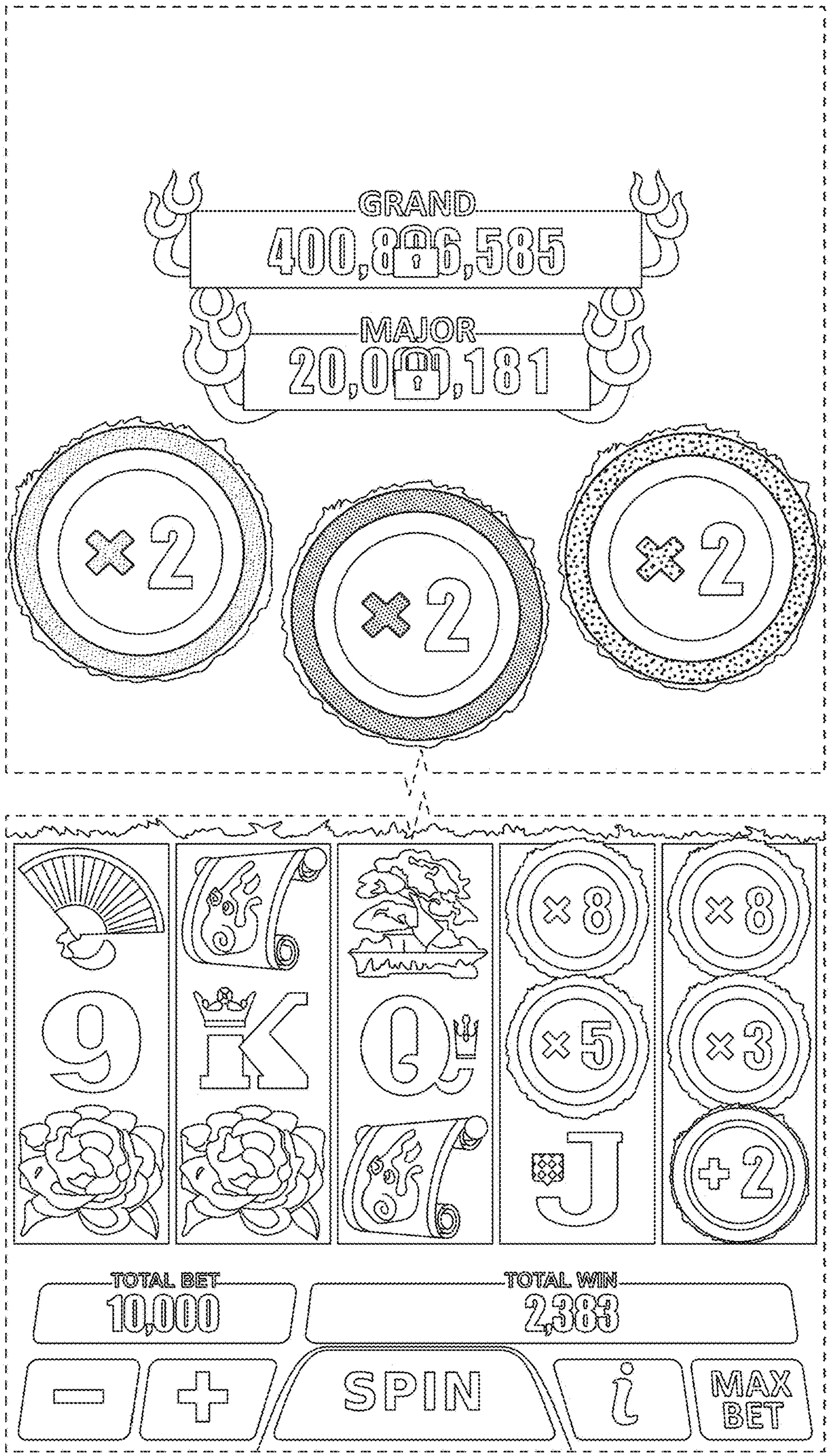
Figure 22:
Figure 23:
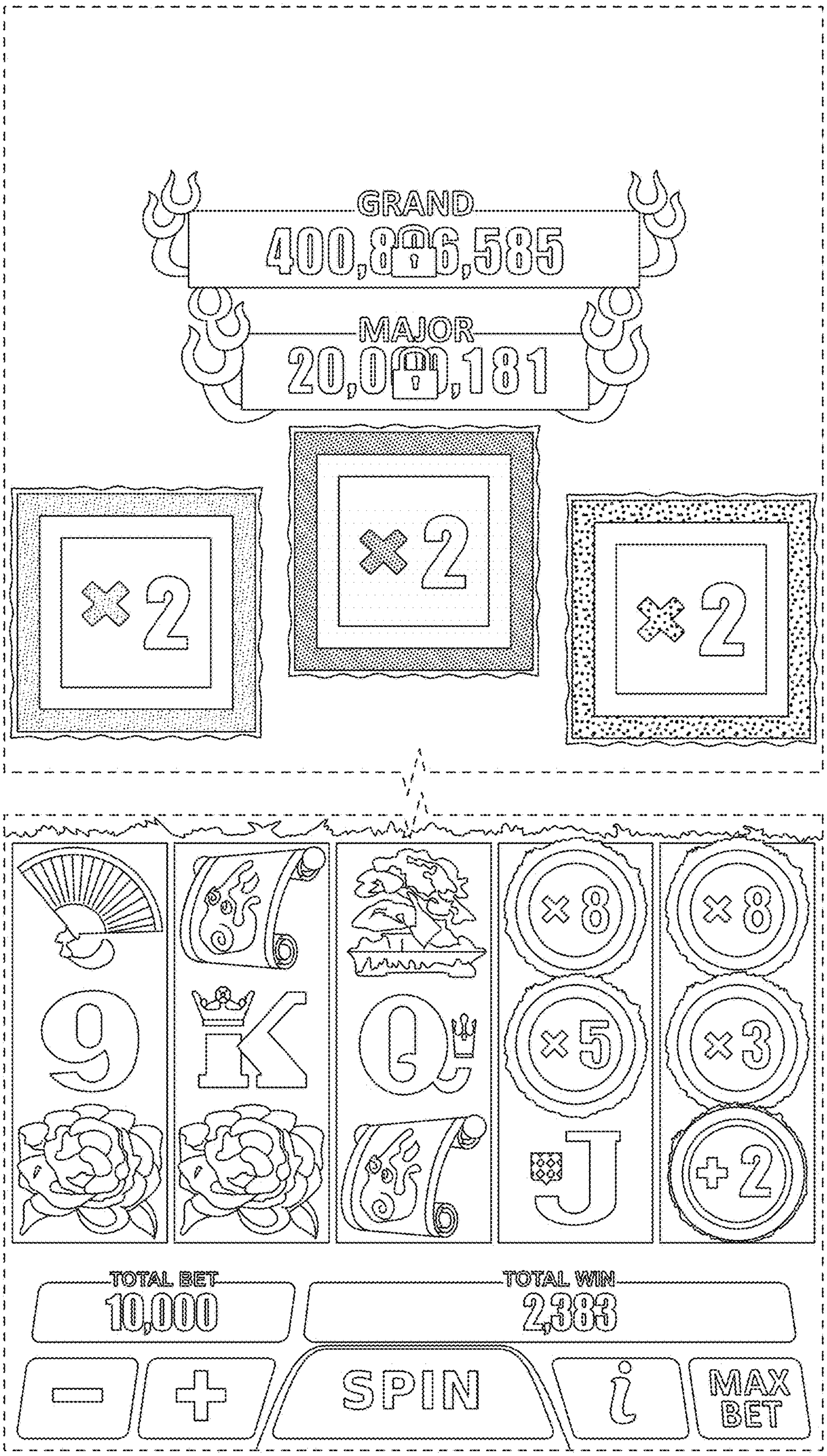
Figure 24:
Figure 25:
Figure 26:
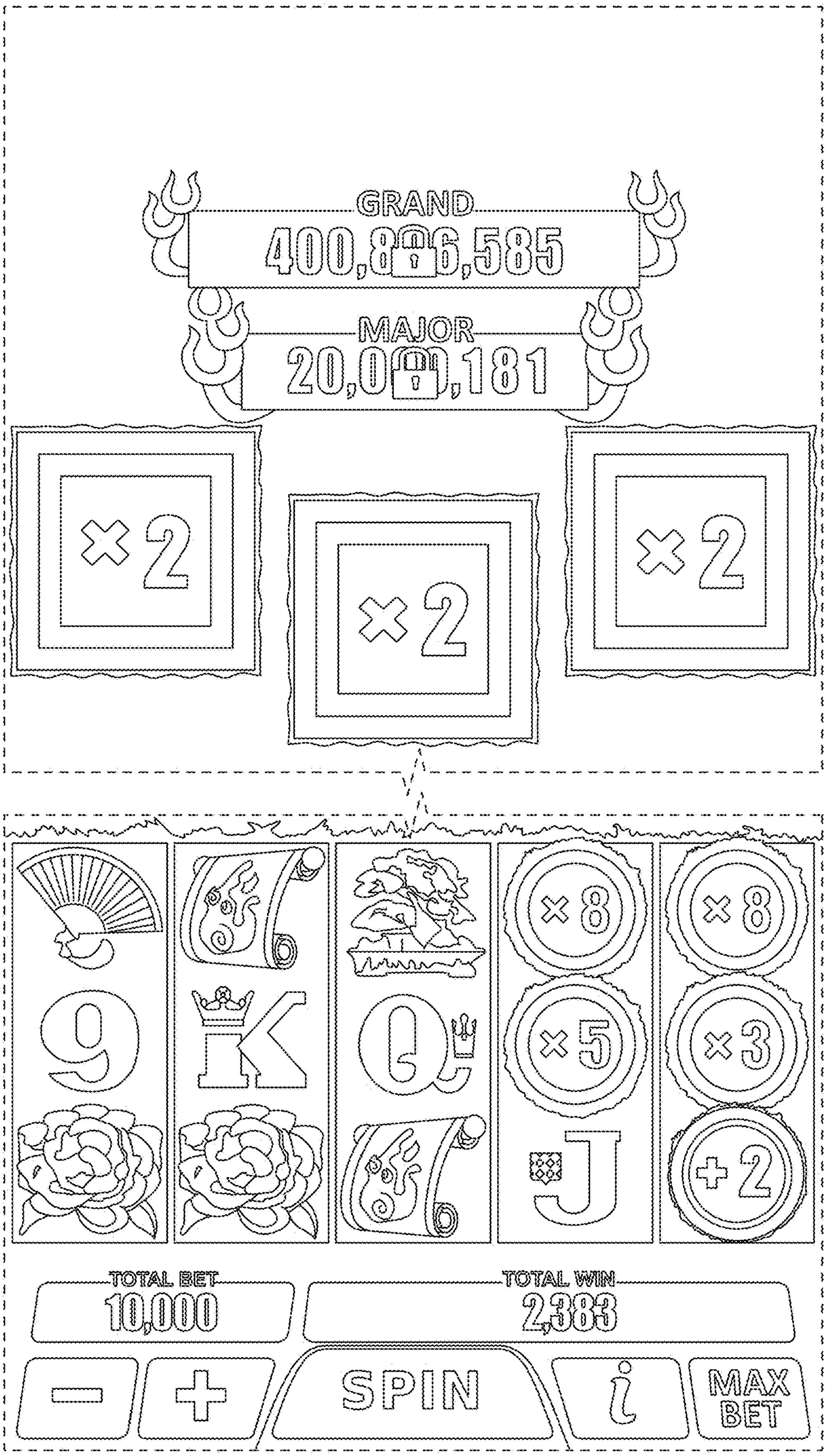
Figure 27:
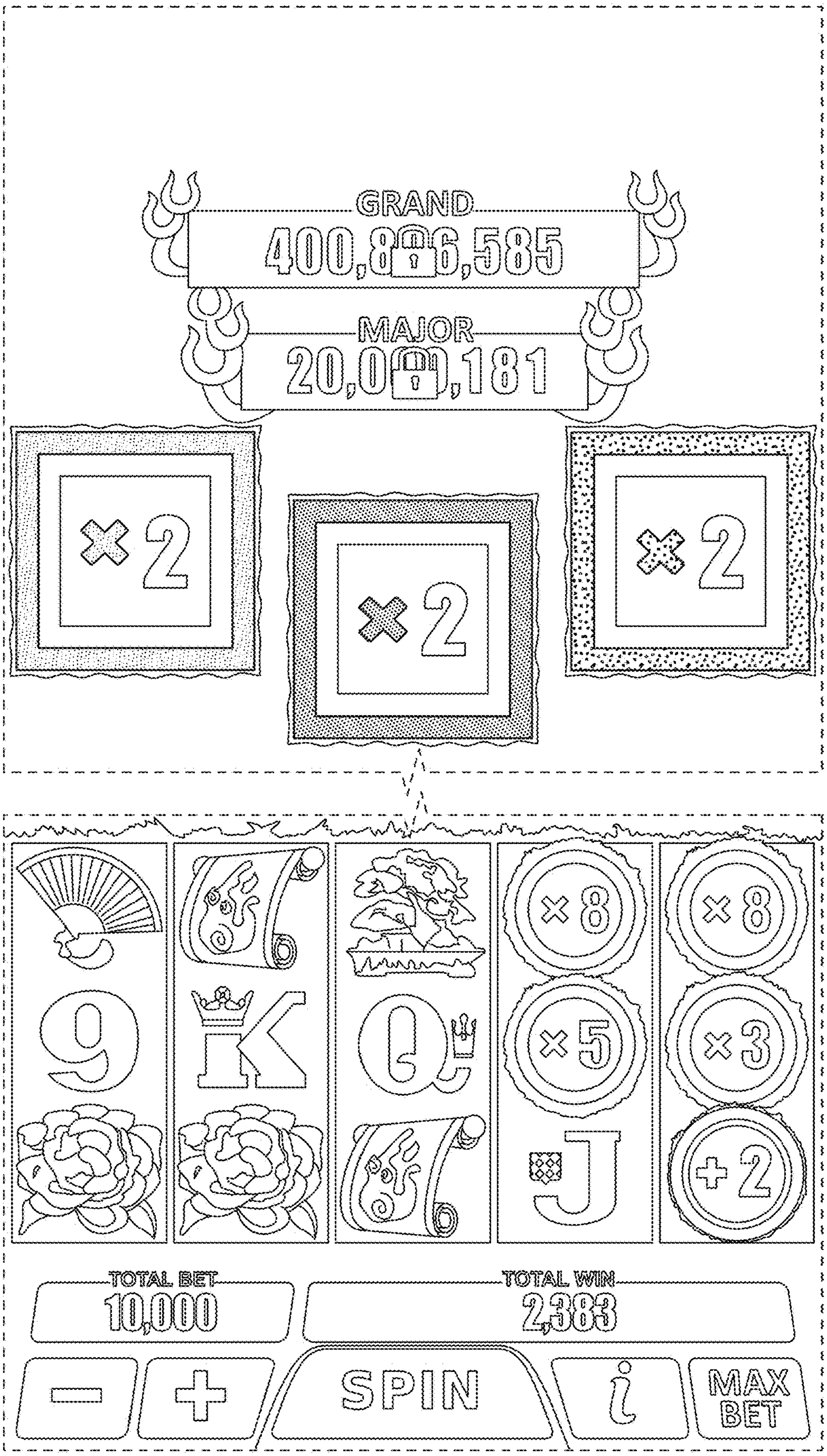
Figure 28:
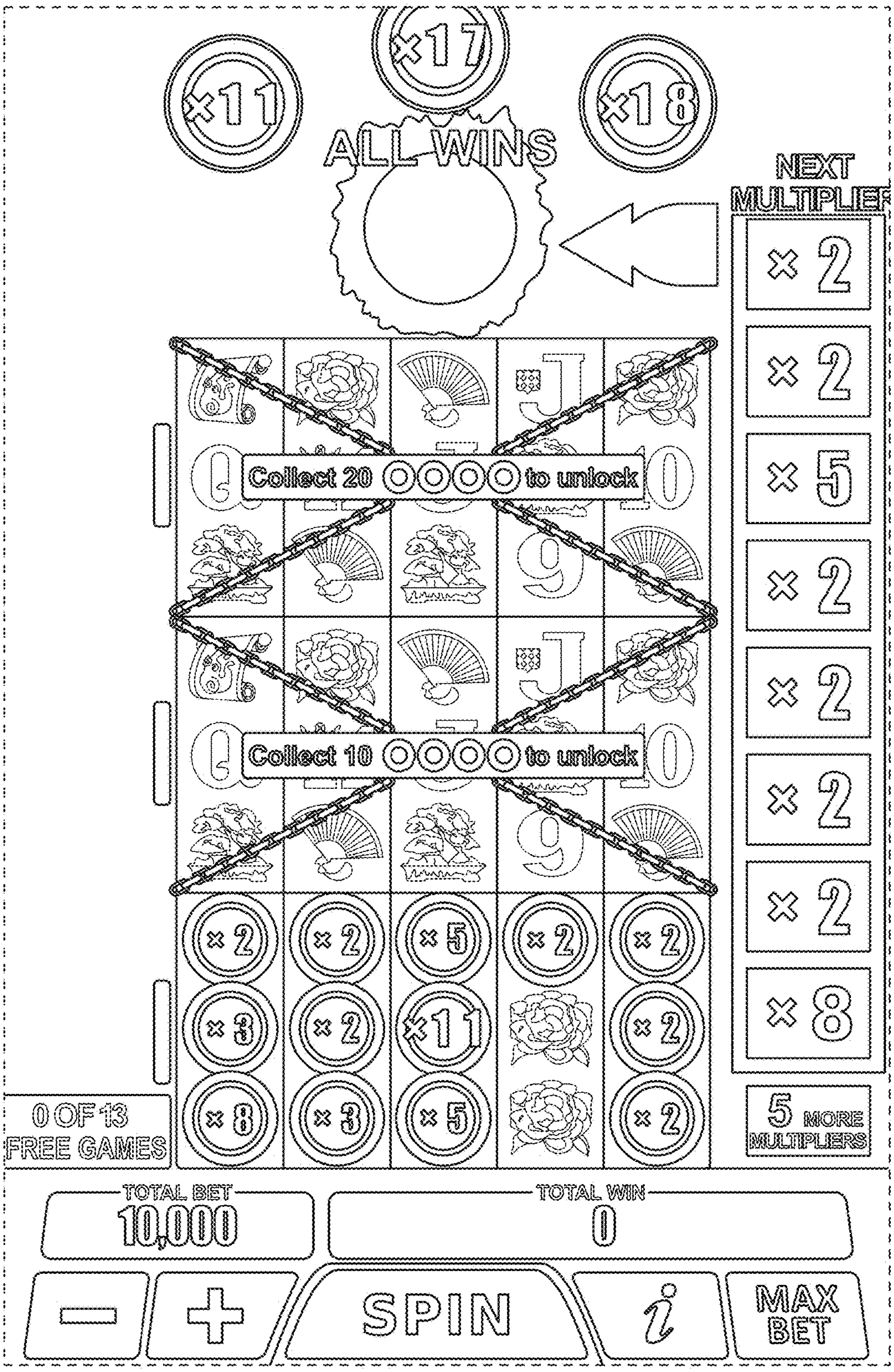
Figure 29:
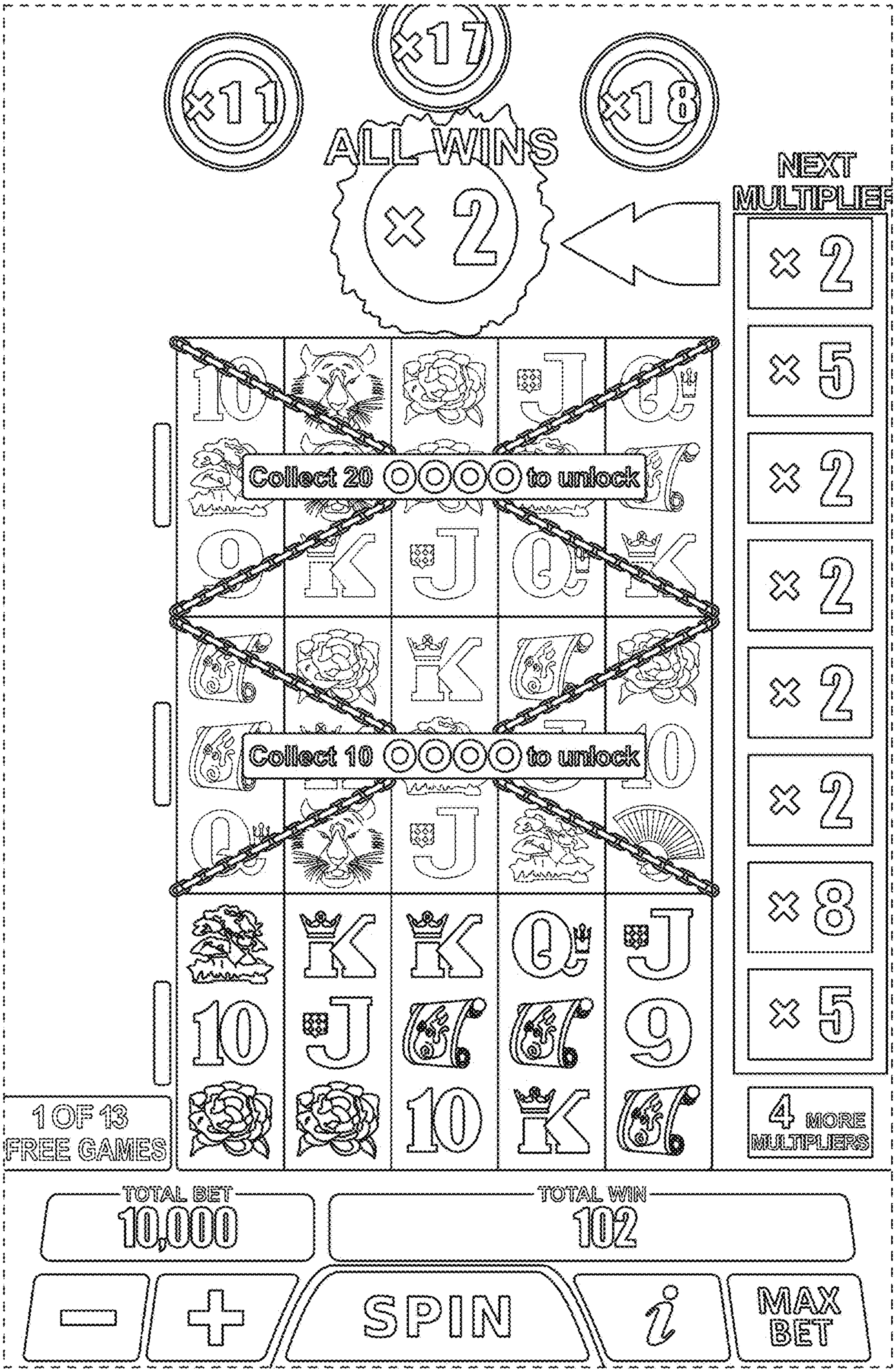
Figure 30:
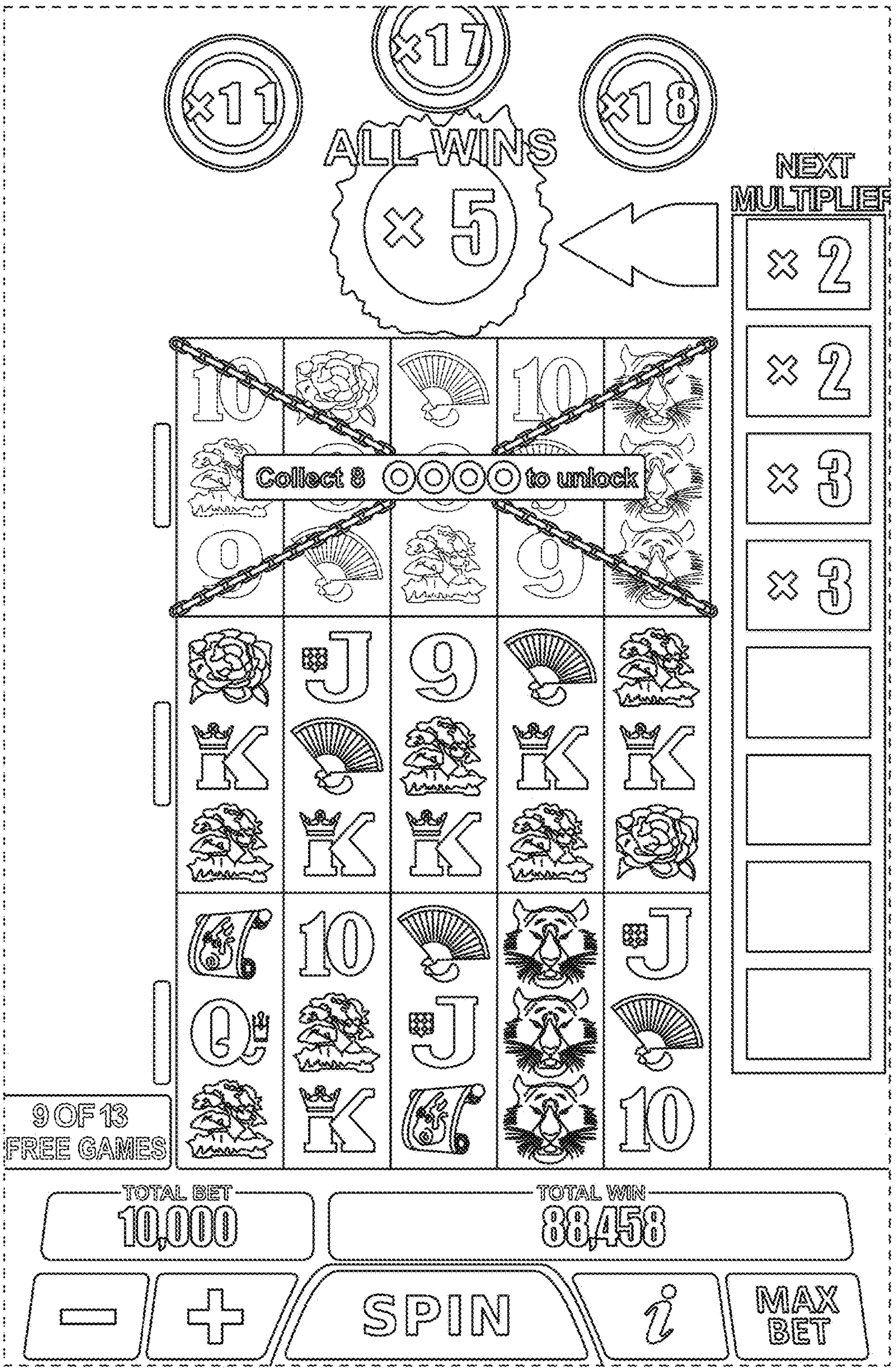
Figure 31:
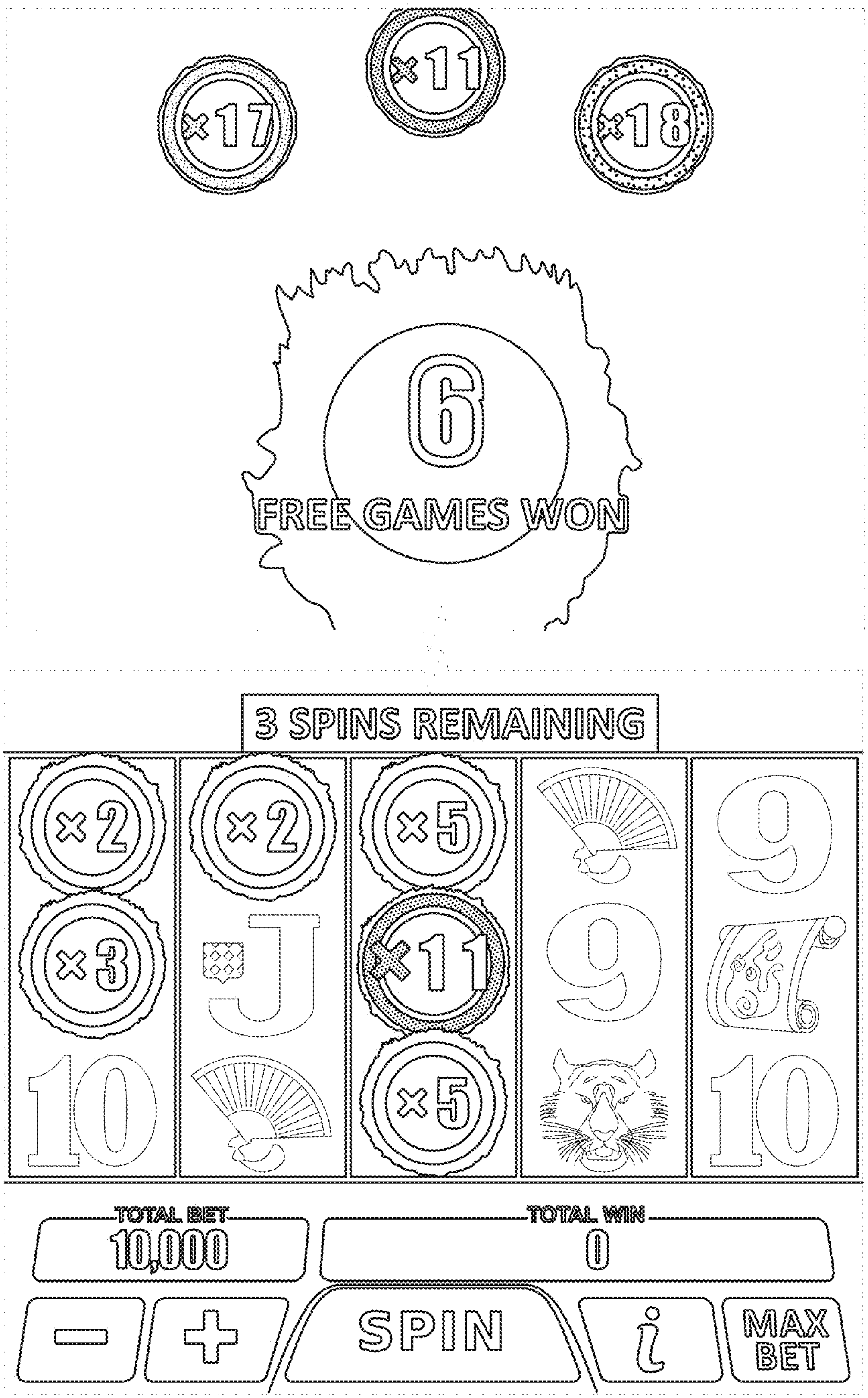

In the further game instances (free games) it is possible to activate additional game windows 1532,1533. In an example, a defined numbers of multiplier symbols being selected in the free games successively unlock game windows. FIG. 17 shows an example where second game window 1712 has been unlocked. Counter 1540 indicates that the processor 204 is currently displaying the outcome of the ninth of thirteen free games. It will also be observed that multiplier chute 1510 has been updated such that the bottom four positions 1715 of the multiplier chute 1510 are empty reflecting that only four more free game instances will be conducted after the current games instance. It will also be observed that a ×3 multiplier 1714 is the last multiplier of the ordered set.

Once all of the free game instances have been conducted, the set of free game instances will end and the processor 204 proceeds to step 740 and resets any awarded multiplier totals before the game ends. In this example, the multiplier total is reset to zero.

FIGS. 18-31 illustrate example screenshots and/or interfaces showing accumulation and application of electronic gaming enhancements, in accordance with the present disclosure.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device comprising:
- at least one memory with instructions stored thereon; and
- at least one processor in communication with the at least one memory, wherein the instructions, when executed by the at least one processor, cause the at least one processor to:
  - cause a number of multiplier symbols to be accumulated during a first electronic game, wherein each multiplier symbol of the number of multiplier symbols is associated with a multiplier value; and
  - for each of the number of multiplier symbols accumulated during the first electronic game, provide a play of a second electronic game, wherein, for at least one play of the second electronic game, the instructions further cause the at least one processor to:
    - cause display of a multiplier symbol of the number of multiplier symbols in a first display area, wherein the multiplier value associated with the multiplier symbol will be applied during the at least one play of the second electronic game;
    - cause display of a subset of the number of multiplier symbols in a second display area comprising a number of multiplier symbol positions, the subset of the number of multiplier symbols comprising remaining multiplier symbols of the number of multiplier symbols associated with remaining multiplier values to be applied in at least one future play of the second electronic game;
    - cause display of at least one outcome for the at least one play on a plurality of reels in a third display area, wherein the at least one outcome is associated with at least one output amount;

apply the multiplier value associated with the multiplier symbol to the at least one output amount to generate at least one multiplied output amount;

provide the at least one multiplied output amount;

cause display of a next multiplier symbol of the subset of the number of multiplier symbols in the second display area to indicate that the multiplier value associated with the next multiplier symbol will be applied in a next at least one play of the second electronic game; and cause display of the subset of the number of multiplier symbols in the second display area shifting by one multiplier symbol position of the number of multiplier symbol positions based on the next multiplier symbol being displayed in the second display area.

2. The electronic gaming device of claim 1, wherein the instructions further cause the at least one processor to provide the first electronic game based on a trigger condition being satisfied in a base game, wherein the trigger condition comprises a threshold number of multiplier symbols being provided in the base game.

3. The electronic gaming device of claim 1, wherein during the first electronic game the instructions further cause the at least one processor to:

cause display of an increment symbol, wherein the increment symbol is associated with a number of increments and an accumulating multiplier symbol of a plurality of accumulating multiplier symbols, and wherein the accumulating multiplier symbol is associated with an accumulating multiplier value; and cause the accumulating multiplier value to increase to an increased accumulating multiplier value based on the number of increments.

4. The electronic gaming device of claim 3, wherein the instructions further cause the at least one processor to, after the number of increments are applied to the accumulating multiplier value, cause the increased accumulating multiplier value to be associated with the increment symbol.

5. The electronic gaming device of claim 3, wherein each of the plurality of accumulating multiplier symbols is associated with a color, and wherein the increment symbol is associated with a same color as the accumulating multiplier symbol associated with the increment symbol.

6. The electronic gaming device of claim 1, wherein the instructions further cause the at least one processor to:

determine a random order for the number of multiplier symbols based on a random number generator (RNG) output; and cause display of the subset of the number of multiplier symbols in the first display area in the random order.

7. The electronic gaming device of claim 6, wherein the instructions further cause the at least one processor to cause display of the next multiplier symbol of the subset of the number of multiplier symbols in the second display area based on the random order.

8. The electronic gaming device of claim 7, wherein the subset of the number of multiplier symbols in the first display area are displayed in the number of multiplier symbol positions based on the random order.

9. The electronic gaming device of claim 1, wherein the instructions further cause the at least one processor to at least one of cause the number of multiplier symbols to be accumulated or provide the at least one output amount based on at least one message received from a server.

10. At least one non-transitory computer-readable storage medium with instructions stored thereon that, in response to execution by at least one processor, cause the at least one processor to:

cause a number of multiplier symbols to be accumulated during a first electronic game, wherein each multiplier symbol of the number of multiplier symbols is associated with a multiplier value; and for each of the number of multiplier symbols accumulated during the first electronic game, cause a play of a second electronic game to be provided, wherein, for at least one play of the second electronic game, the instructions further cause the at least one processor to:

cause a multiplier symbol of the number of multiplier symbols to be displayed in a first display area, wherein the multiplier value associated with the multiplier symbol will be applied during the at least one play of the second electronic game;

cause a portion of the number of multiplier symbols to be displayed in a second display area comprising a number of multiplier symbol positions, the portion of the number of multiplier symbols comprising remaining multiplier symbols of the number of multiplier symbols associated with remaining multiplier values to be applied in at least one future play of the second electronic game;

cause at least one outcome for the at least one play to be displayed on a plurality of reels in a third display area, wherein the at least one outcome is associated with at least one output amount;

cause the multiplier value associated with the multiplier symbol to be applied to the at least one output amount to generate at least one multiplied output amount;

cause the at least one multiplied output amount to be provided;

cause a next multiplier symbol of the portion of the number of multiplier symbols to be displayed in the second display area to indicate that the multiplier value associated with the next multiplier symbol will be applied in a next at least one play of the second electronic game; and cause display of the portion of the number of multiplier symbols in the second display area shifting by one multiplier symbol position of the number of multiplier symbol positions based on the next multiplier symbol being displayed in the second display area.

11. The at least one non-transitory computer-readable storage medium of claim 10, wherein the instructions further cause the at least one processor to cause the first electronic game to be provided in response to a trigger condition being satisfied in a base game, wherein the trigger condition comprises a predetermined number of multiplier symbols being provided in the base game.

12. The at least one non-transitory computer-readable storage medium of claim 10, wherein during the first electronic game the instructions further cause the at least one processor to:

cause an increment symbol to be displayed, wherein the increment symbol is associated with a number of increments and an accumulating multiplier symbol of a plurality of accumulating multiplier symbols, and wherein the accumulating multiplier symbol is associated with an accumulating multiplier value; and cause the accumulating multiplier value to increase to an increased accumulating multiplier value based on the number of increments.

13. The at least one non-transitory computer-readable storage medium of claim 12, wherein the instructions further cause the at least one processor to, after the number of increments are applied to the accumulating multiplier value, cause the increased accumulating multiplier value to be associated with the increment symbol.

14. The at least one non-transitory computer-readable storage medium of claim 12, wherein each of the plurality of accumulating multiplier symbols is associated with a color, and wherein the increment symbol is associated with a same color as the accumulating multiplier symbol associated with the increment symbol.

15. The at least one non-transitory computer-readable storage medium of claim 10, wherein the instructions further cause the at least one processor to:

determine a random order for the number of multiplier symbols based on a random number generator (RNG) output; and cause the portion of the number of multiplier symbols to be displayed in the first display area in the random order.

16. The at least one non-transitory computer-readable storage medium of claim 15, wherein the instructions further cause the at least one processor to cause the next multiplier symbol of the portion of the number of multiplier symbols to be displayed in the second display area based on the random order.

17. The at least one non-transitory computer-readable storage medium of claim 16, wherein the second display area comprises a number of multiplier symbol positions, wherein the portion of the number of multiplier symbols in the first display area are displayed in the number of multiplier symbol positions based on the random order.

18. The at least one non-transitory computer-readable storage medium of claim 10, wherein the instructions further cause the at least one processor to cause the at least one play of the second electronic game to be provided by transmitting at least one message associated with the at least one multiplied output amount to an electronic gaming device where at least one of the first display area, the second display area, or the third display area are displayed.

19. A method of electronic gaming implemented by at least one processor in communication with at least one memory, the method comprising:

controlling a number of multiplier symbols to be accumulated during a first electronic game, wherein each multiplier symbol of the number of multiplier symbols is associated with a multiplier value; and for each of the number of multiplier symbols accumulated during the first electronic game, providing a play of a second electronic game, wherein, for at least one play of the second electronic game, the method further comprises:

controlling display of a multiplier symbol of the number of multiplier symbols in a first display area, wherein the multiplier value associated with the multiplier symbol will be applied during the at least one play of the second electronic game;

controlling display of a subset of the number of multiplier symbols in a second display area comprising a number of multiplier symbol positions, the subset of the number of multiplier symbols comprising remaining multiplier symbols of the number of multiplier symbols associated with remaining multiplier values to be applied in at least one future play of the second electronic game;

controlling display of at least one outcome for the at least one play on a plurality of reels in a third display area, wherein the at least one outcome is associated with at least one output amount;

applying the multiplier value associated with the multiplier symbol to the at least one output amount to generate a multiplied at least one output amount;

providing the at least one output amount;

controlling display of a next multiplier symbol of the subset of the number of multiplier symbols in the second display area to indicate that the multiplier value associated with the next multiplier symbol will be applied in a next at least one play of the second electronic game; and controlling display of the subset of the number of multiplier symbols in the second display area shifting by one multiplier symbol position of the number of multiplier symbol positions based on the next multiplier symbol being displayed in the second display area.

20. The method of claim 19, further comprising, during the first electronic game:

controlling display of an increment symbol, wherein the increment symbol is associated with a number of increments and an accumulating multiplier symbol of a plurality of accumulating multiplier symbols, and wherein the accumulating multiplier symbol is associated with an accumulating multiplier value; and controlling the accumulating multiplier value to increase to an increased accumulating multiplier value based on the number of increments.

* * * * *